May 19, 1953
O. BROWN
2,639,107
INTERCOOPERATIVE SYSTEM FOR AIR-BORNE AND SURFACE CARRIERS
Filed Nov. 1, 1946
5 Sheets-Sheet 1
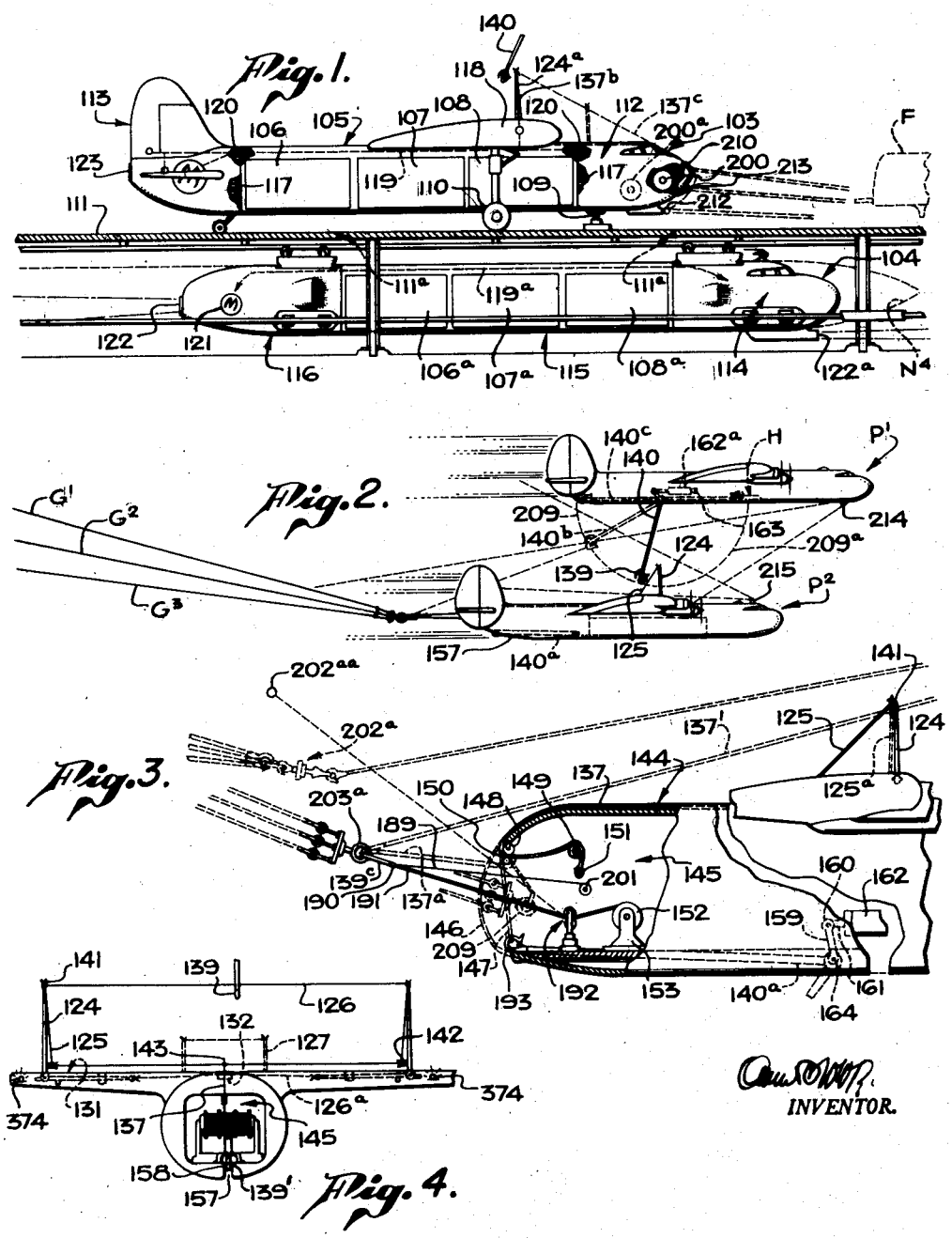

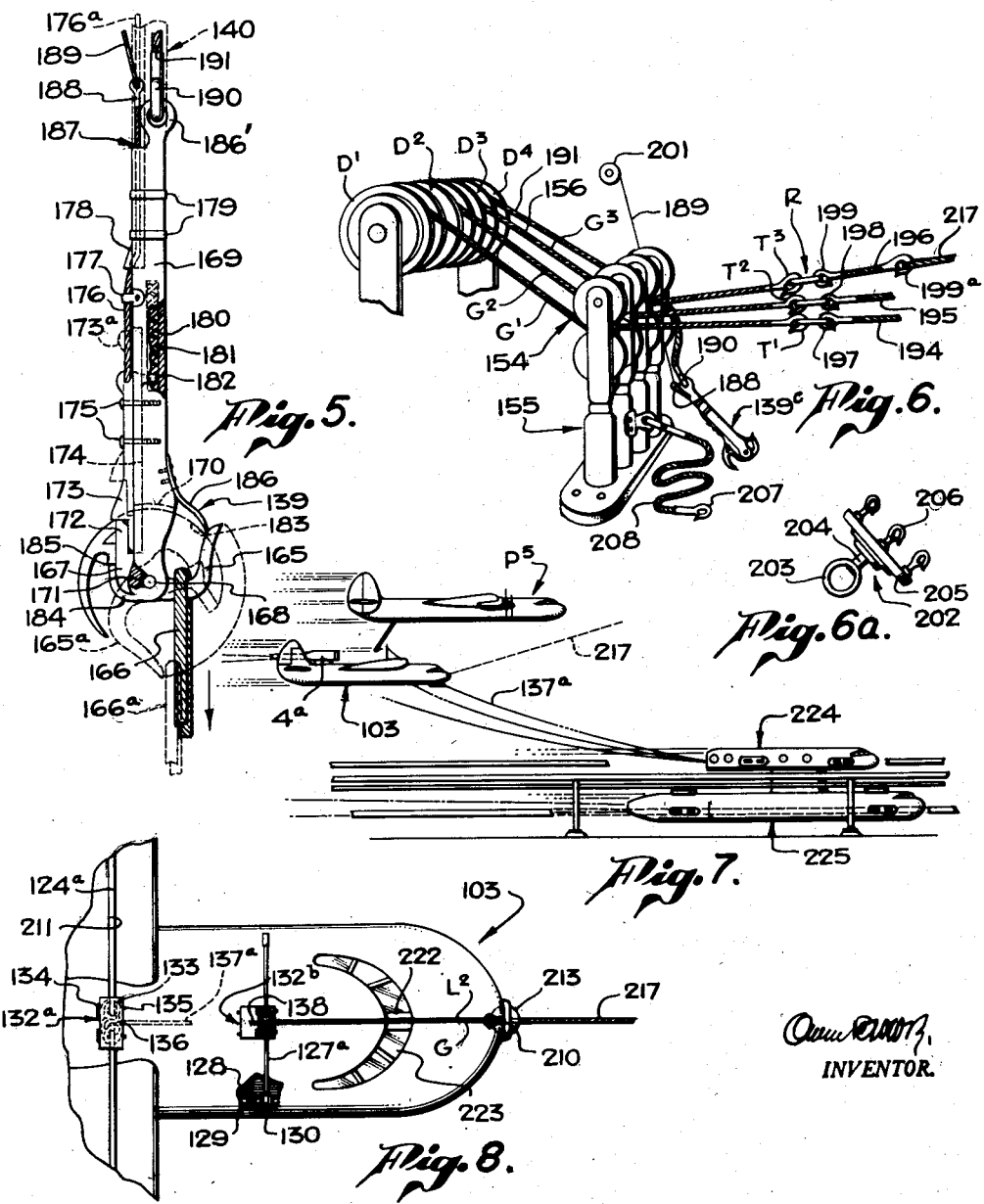

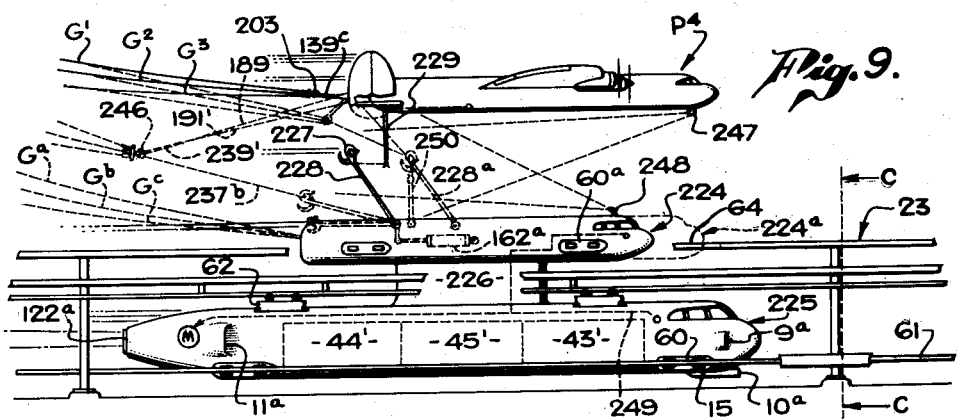
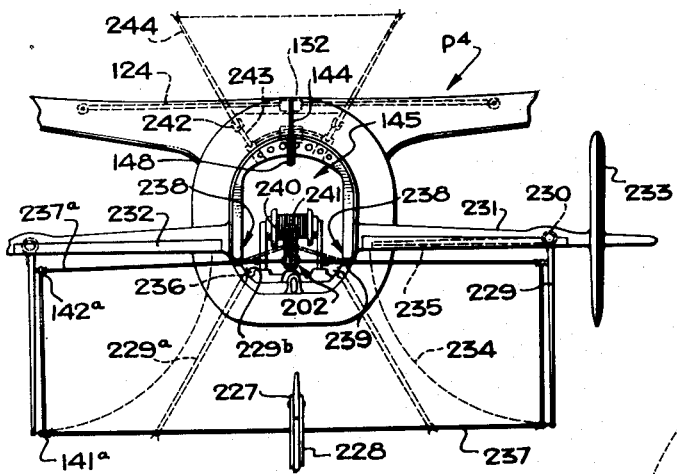
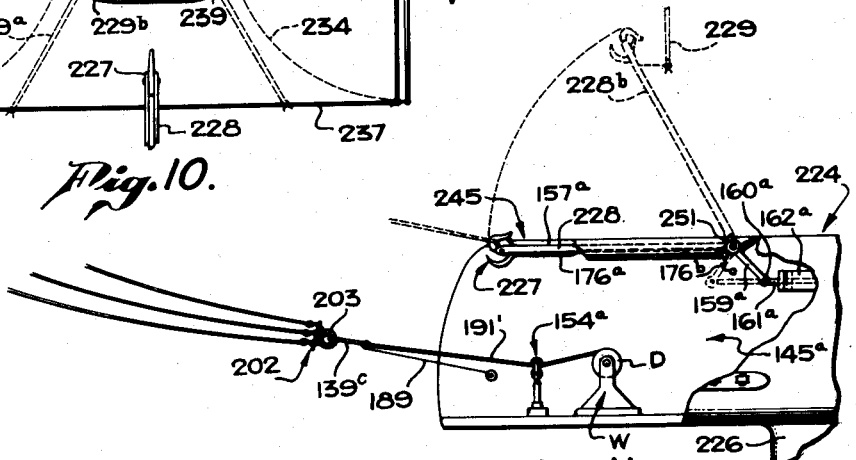

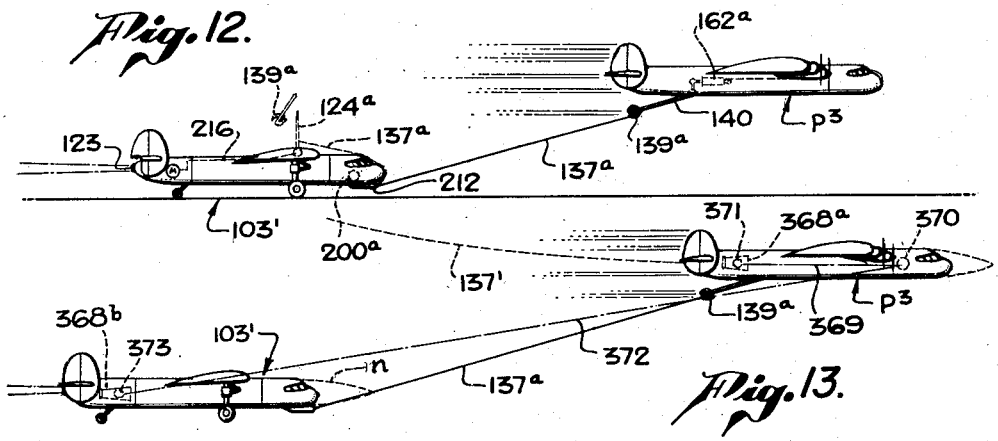
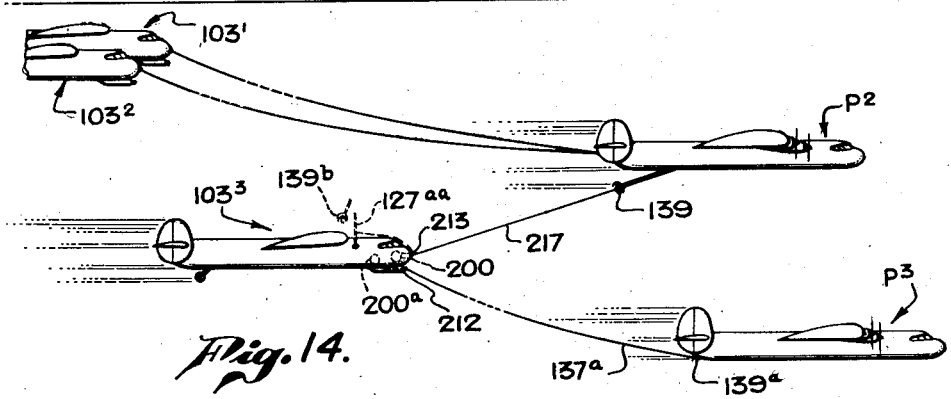
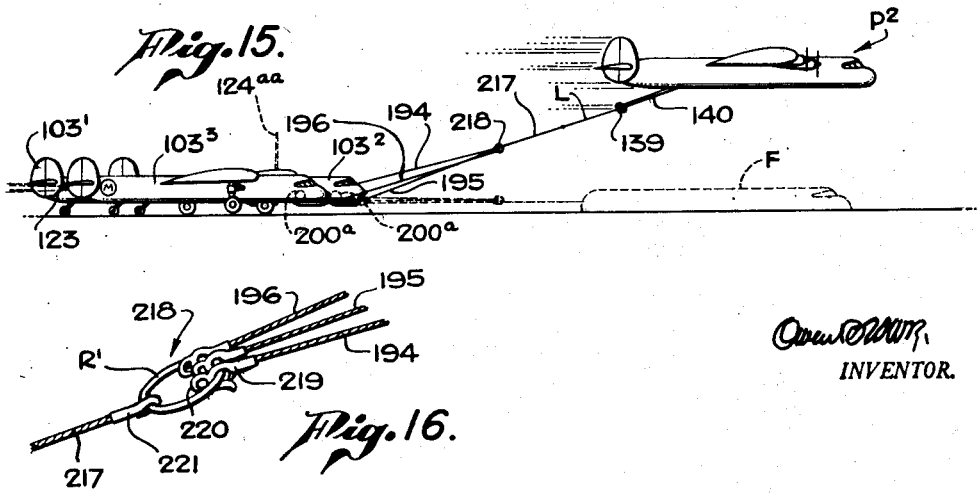

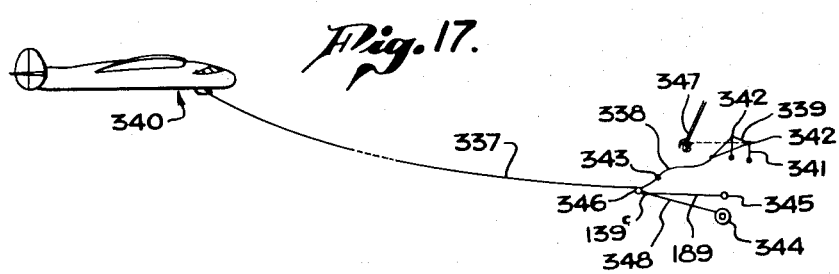
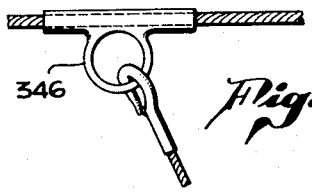
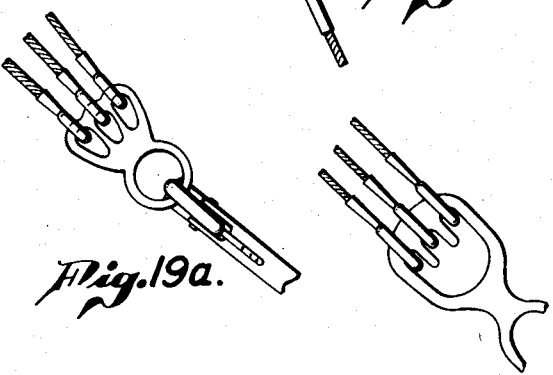
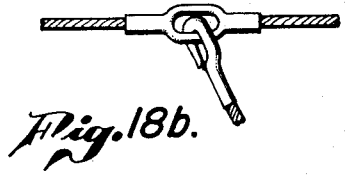

Patented May 19, 1953

2,639,107

UNITED STATES PATENT OFFICE 2,639,107

INTERCOOPERATIVE SYSTEM FOR AIRBORNE AND SURFACE CARRIERS

Owen Brown, Los Angeles, Calif.

Application November 1, 1946, Serial No. 707,153

27 Claims. (Cl. 244—3)

The present invention comprises a new transglobal system of transportation.

In one broad embodiment, it includes both airborne and railborne components in novel intercooperative relationships. In lesser embodiments, however, aircraft only are employed according to entirely new modes of operation therewith and therebetween.

My railborne vehicles differ inherently from current types of rail carriers in that in the presently envisioned system there are no prime driver and driven members dependent upon frictional contact with the rails in order to effect drawbar pull. Instead, propulsion is accomplished primarily by means of thermal reaction type motors such as hereinafter described.

Thus it becomes readily possible for my surface carriers to attain ground speeds which may equal or even exceed the cruising speeds of existing transport aircraft. Moreover I introduce a form of ground carrier which may be also utilized in direct cooperation with both powered airplanes and airplane gliders, whereby to effect a reorientation of domestic freight and passenger movements, on the one hand, and also to interlink many navigable parts of the globe with a new and improved sub-system of overseas air transport.

Said sub-system co-acts with said railborne components (of the over-all organization) for overland haulage at contemplated far lower tonmile costs than would be possible of attainment by employing either self-propelled airborne cargo carriers, according to the prevailing system, or by the overland towing of glider trains utilizing airplane locomotives solely. The latter, however, may be operated in those regions where the type of rail trackage and the vehicular devices herein proposed are not available.

Switching cargoes in mid-air

In brief, it now becomes possible—and economically quite profitable—to tow continuous trains of gliders to and from various parts of the globe by a method of changing the locomotive planes aloft; that is, while flying above a required number of intermediary re-fueling stations. And on arrival over the continental United States, for example, such an entrained group of gliders could, according to one option, be switched in midair from its overseas tow-plane to another fully fueled tow-plane in waiting, continuing thence non-stop to the final point or points of cargo destination.

The still more economical method, however, is to switch the glider trains directly to awaiting rail carriers, of the class which was earlier referred to. The latter, adapted to travel at the aforesaid airplane speeds, to exchange tow burdens with the tow-planes, and to tow any given number of gliders faster and far more economically than they could be towed overland by locomotive plane, constitute said railborne units of the system. The method of performing such transfers of the gliders, from one locomotive to another, will be described hereinafter.

Among the broader objects of the invention is the provision of means for quickly, economically linking together respective domestic and various other areas of the globe, as generally foretold, whereby a vast tonnage of cargo may be moved rapidly by glider trains directly from local points of origin to points of destination and delivery remote therefrom; this to be accomplished without expensive unloadings, re-loadings or other intermediary handlings of said cargo, regardless of the distances which must be spanned over land and/or sea therebetween.

Another object is to effect a drastic reduction in the cost of transporting passengers by air.

Sundry other objectives will be revealed from the accompanying detailed descriptive matter, the claims, and the drawings. With reference to the latter—

Fig. 1, in side elevation, shows one preferred type of glider craft, as herein contemplated, and a jet-propelled ground car therebelow; the latter not detailed, however, since not claimed per se in the present application.

Fig. 2 is an aerial side elevational view and illustrates the method whereby one or more gliders may be transferred from one locomotive plane to another while airborne.

Fig. 3 is a partial view of the lowermost of the two planes of Fig. 2, foreshortened and broken away at the rear end section of the fuselage to more clearly show certain novel transfer tackle.

Fig. 4, largely diagrammatic and looking from the rear, shows one preferred arrangement of certain of the tackle components seen in Figs. 2 and 3.

Fig. 5 illustrates a new type snatch-hook (which may also be employed as a cable release) to be further explained.

Fig. 6, in perspective, shows how a plurality of gliders (not therein included) comprising the burden units of a particular air train according to the invention, may, by option, be all together or individually switched from one locomotive to another.

Fig. 6a shows one type of so-called harness which may be used with the tackle of Fig. 6.

Fig. 7, in side elevation, shows other versatile features of the system, including the method by which one or more airborne gliders may be towed overland by rail car at airplane speeds, or may be switched in mid-air from the tow car to a locomotive feeder plane for off-route delivery.

Fig. 8 is a fragmental plan view of a glider craft having certain essential tackle components to be explained.

Fig. 9 is a closer-up view, in side elevation, of the tow-car and glider tackle first seen in Fig. 7, including certain glider switching apparatus carried respectively by said car and by a locomotive plane cooperable therewith.

Fig. 10 is a rear-end view, in part, of the tow-plane of Fig. 9, including certain optional tackle elements.

Fig. 11 is a side elevational view of the rear end of the tow-cab carried by the ground car of Fig. 9, broken open to show one detailed arrangement of the transfer tackle.

Fig. 12 is the side-elevational view of a pilot plane picking up a loaded glider with the aid of assisted take-off means on the glider.

Fig. 13 is similar to Fig. 12 but shows the aforesaid glider being partially motor-boosted and partialy tug-lifted into the air by said pilot craft.

Fig. 14, in side elevation, shows the glider of Figs. 11 and 13 being switched in midair from the aforesaid pilot plane to a "limited" locomotive plane.

Fig. 15, also side elevational, shows how, alternatively, the limited plane of Fig. 14 may pickup a fully constituted train of loaded gliders.

Fig. 16 illustrates another optional type of transfer harness.

Fig. 17 is the schematic representation of a modified, extremely simple form of transfer tackle which could be used.

Figs. 18$a$ and 18$b$ are details of tackle elements especially adapted to the arrangement disclosed in Fig. 17.

And Figs. 19$a$ and 19$b$ indicate still other simplified types of harness which may be employed in burden-transfers.

Like reference characters in the drawings indicate parts of like structure and like functions, unless otherwise specifically designated.

It will be understood that in a complex system such as proposed many auxiliary features must be omitted from the present description, and the latter limited largely to the apparatus upon which my present claims are primarily predicated. Thus, with regard to Fig. 1, while one, more simplified, form of ground car 104 is shown in connection with the glider 103 directly thereabove, only the latter need be presently considered, and relative to such railborne elements as may be utilized in carrying out the present invention. These will be described duly.

First, however, means for movement of the glider trains over thousands of miles of either land or water, or both, will be dealt with in relation to said Fig. 1 and various other views. It is provided, in brief, that such glider trains may be towed non-stop over any predetermined route or routes, for any predetermined distance, without having to repeatedly land and then re-launch the individual gliders en route, while refueling the tow plane—a pre-requisite which, up to now, has been deemed one of the major obstacles standing in the way of economical long-range glider operation. The special apparatus and techniques explained herein, however, will be more readily understood by first briefly describing certain typical problems of transglobal haulage, wherein tonnage now moving largely by water and railroad, with much intermediary handling, can be more economically transported.

Foremost among these problems is the one (herein overcome) of towing gliders at high continuous speeds without intermediary landings from the initial pickup point to the point of final destination. On very long hauls there has, heretofore, been no apparent answer to this aeronautical conundrum. The difficulty is now overcome by the provision of means whereby any correct number of fully loaded gliders can be first picked up and then transferred in the air to a given, hypothetical limited tow-plane A (not so designated in the drawings); can then be towed by plane A to a predetermined distant location, defined as a first relay station, and there switched in midair and at cruising speeds from plane A to a fully fueled tow-plane B, before exhaustion of the fuel supply of plane A; from which relay station the glider train is further towed to a second relay station, where a tow-plane C takes over the train from plane B; and thus onward to the nearest continental rail terminal of the system. Here the gliders may be transferred to yet another tow-plane, or to a railborne locomotive as previously mentioned.

The last of the arriving tow-planes, in turn, may upon refueling receive a correct number of other outbound gliders, and these relayed back over the route previously traveled by planes A, B, etc., following the same method of switching the gliders from one to another.

*Glider switching components*

Apparatus which may be used for long range glider freighting will now be described, referring first to Figs. 2, 3 and 4.

Fig. 2 features two typical so-called locomotive or tow-planes, according to the invention, which are conveniently called planes $P^1$ and $P^2$. And plane $P^2$ is observed to be towing a train of three gliders (not specifically shown), which will be hereafter referred to, for the time being, by their respective tow-lines, namely: gliders $G^1$, $G^2$ and $G^3$ as indicated. In the drawing, plane $P^1$ is seen a brief moment before taking over the entire tow-burden comprised of gliders $G^1$, $G^2$ and $G^3$ from plane $P^2$. The method for accomplishing this is comparable, in some respects, to that long followed, in the conventional pickup of mail pouches from so-called ground stations, and as further modified, during the late world war, by the Air Transport Command for picking up United States Army gliders. The required tackle is well known and need not be fully detailed here.

The pickup operation is performed by a specially reconstructed airplane, and, in the case of mail pickups, such a plane is fitted with an extensible-retractable boom having, at its freely swingable end, a readily detachable pickup hook; said hook being affixed, also, to one end of a tow-line having its other end secured to the drum wheel of an automatic inboard winch, and said winch adapted with a shock-absorbing element and delayed-action braking shoes.

Thus, when the pickup hook is swung downward on the end of the boom and the plane flown in such manner as to bring said hook into engagement with the upper, tautly stretched cross-cord of the conventional ground loop, the latter will be jerked loose from its break-out clips while the hook, also, will be freed from the end of the boom.

The existing method, or methods, of picking up and towing gliders is similar to the mail pickup procedure, except that a different type of pickup and towing tackle is carried by the tow-plane. In either case, however, it is obvious that no local landing facilities—other than terminal airports—are required so far as the pickup plane is concerned. Improved pickup techniques will be given later, relative especially to glider 103.

First, however, it is observed that tow-plane P² is equipped with a duality of bantam size standards 124 which, in their erect positions, are adapted to suspend a loop 125, having a cross-cord 126 therebetween; said cross-cord being seen to best advantage in Fig. 4. Standards 124 may be widely spaced, if desired, in which case they can be pivotally mounted just below the respective upper wing surfaces substantially as indicated. In practice, however, it may be found entirely practicable to provide the more midget size standards 127, as shown in phantom, for the reason that engagements of the character contemplated are made at approximately equalized speeds, and quite deliberately as compared to the operation of ordinary pickup planes.

For a clear illustration, it will be assumed that standards 124 are to be employed; and these may be extended and retracted according to any suitable arrangement therefor, such as briefly indicated, for one illustration, by a pulley line 128 on the glider 103 of Fig. 8, carried over the wheel 129, and adapted to cause partial rotation of standard 127ª there shown from its pivoted end 130. The tow-plane standards 124, Fig. 4, are preferably mounted to retract within the grooving 131; and when so retracted the cross-cord 126 is seen to lie in position 126ª between the tips of the standards. In this particular arrangement, which of course may be variously modified, the remainder of the loop proper is adapted to be compactly disposed within a small compartment, conveniently called box 132, similar to box 132ª of Fig. 8, which, in this latter and somewhat modified plan view, may be seen to better advantage.

With further reference to Fig. 8, therefore, it is observed that box 132ª has a lid 133, including hinges 134 and snap-fasteners 135. A small opening 136 is provided through which the pickup line 137 (Fig. 4) is adapted to extend outboard, although it is apparent that in Fig. 8 said pickup line—line 137ª—runs therefrom in an opposite direction, as will later be more specifically explained in relation to said Fig. 8 view and the glider components. The nearby box 132ᵇ shows another like arrangement of the lid member in an open position, featuring particularly a small spring 138 which serves to keep the lid in a shut position, usually, but yieldingly allows the same to be opened automatically when standards 127ª, in this case, are suddenly erected and the loop is forcibly hoisted from the box in the correct position for engagement by hook 139, Fig. 2, for example, appendent from boom 140 of plane P¹.

Relative, particularly, to the arrangement of Fig. 4, it is noted that each standard 124 has a break-out clip 141 at its upper end. If desired, auxiliary clips 142 may be affixed to the lower shanks of the standards whereby to maintain the relatively small loop in a more openly disposed position for its ready engagement by hook 139. Small flag beacons, as on ground station poles, are optional; or the loop cord could merely be of a bright color or colors to increase visibility.

Referring to the more detailed view of Fig. 3, it is observed that loop 125, which, in accord with auxiliary clips 142 of Fig. 4, may be in position 125ª, is adapted to be ended in the form of a knot 143 (Fig. 4), from which the tow-line 137, before being freed from the aforesaid box 132, extends through a small opening in the lid of same, comparable to opening 136 of Fig. 8, and thence along a grooved recess 144. See also Fig. 10. Grooving 144 is normally formed in the outer skin at a location midway of standards 124, following the configuration of the fuselage backward to an opening at the rear end of the plane, approximately in the position occupied by the tail gunner on B29 Superfortresses, United States Air Force. This opening leads into a compartment conveniently called the tow-room 145, Figs. 3, 4 and 10, which may be closed by any suitable bubble door 146, Fig. 3, or by door 147, as preferred.

Tow-line 137 is admitted, through a suitable small opening in the door panels—when the latter are closed—into tow-room 145 and thence, as a matter of convenience, may be carried around pulley wheel 148 and given a few turns around a fixture 149, or otherwise temporarily disposed of at its inboard end. Line 137 may be additionally snugged by any preferred retractable or yieldable device 150, and is fitted at its free end with the simple snap-on hook 151.

Normally, and preferably, gliders $G^1$, $G^2$ and $G^3$ may be towed by their individual tow-lines from a triality of towing drums $D^1$, $D^2$ and $D^3$, as clearly seen in the detail of Fig. 6; which drums, for illustrative purposes, are merely indicated in Fig. 3 by the drum 152 of winch 153. Thus from drums $D^1$, $D^2$ and $D^3$ lines $G^1$, $G^2$ and $G^3$ are carried through the respective triality of upper and lower sheave-wheels 154, mounted for swiveling movement on stanchions 155. If desired, one or more markings, such as colored bands 156, may be placed at spaced intervals along each of the tow-lines; so that when all three of the colors—any of them which are identical—are exactly abreast, as seen in Fig. 6, they may indicate at a glance that the same—or any predetermined—length of line has been payed out to each of the three gliders. Or two outer lines, indicated by blue bands, for example, may represent equal lengths of line running to gliders $G^1$ and $G^3$, while a centrally disposed band of red on line $G^2$ may serve to indicate that the centermost glider $G^2$ is in a relatively farther or closer position to the tow plane than the other two.

By having each color represent a definite footage of tow-line, with optional intermediary indicia of a similar character (as, for example a red, a blue or a yellow band adjacent one or more black rings at other spaced intervals) it would be possible for the master tow-pilot, in room 145, to instantly ascertain at any time, day or night, the exact relative distances of the gliders from the tow-plane. And this arrangement, when used in conjunction with an intercommunicating radio telephone system and other desirable controls (not graphically shown) should result in further improving the techniques of glider control.

Drums $D^1$, $D^2$ and $D^3$ may be integrally mounted on separate winches or, preferably, abreast of one another as a multiple or compound automatic winch; said winch being operable, by preference, from a single motor and from a single control panel (not shown) whereby, according to one option, the respective drums could all be turned in unison; according to another option, could be turned any two at a time without co-rotation of the third; or could be operated singly to either retrieve or to pay out line to one, only, of the gliders at a particular time. It will be unnecessary to define such an automatic compound winch in further detail, including detailed clutch apparatus and auxiliaries, such as fleeting devices and the like, if and as required, since the same may be readily produced in accord with the above general specification by such skilled specialists, for instance, as the technicians of Foote Bros. Gear and Machine Co., Chicago, Ill., who also are familiar with winch mechanisms in relation to glider and pickup operations. (See also later reference to a possible fourth component of said multiple winch, defined as stand-by drum $D^4$.)

Although not featured on plane $P^1$, it will be understood that both of the tow-planes $P^1$ and $P^2$ may have the same or similar pickup tackle, such as already described with regard to Figs. 2, 3 and 4, inclusive of Figs. 6 and 8, so that in one relationship plane $P^1$ is the so-called "pick-up" or "take-over" plane and $P^2$ the "hand-over" plane, distinctions which will shortly be made quite clear. But in a reversal of such relationships, plane $P^2$ could be operated for taking over a tow-burden from plane $P^1$ and the latter, in that case, would become the "hand-over" plane.

Hence both planes are equipped with the respective booms 140 and 140$^a$; but in the relations seen in Fig. 2 boom 140 has been extended to its normal "take-over" position while boom 140$^a$ is in its idle, fully retracted position within a suitable recess 157; in which latter location its hook 139 may appear as thus indicated, in general, by the rear end view of Fig. 4. If desired, suitable spring-operated locking and releasing means 158, or the like, may be positioned to assist in maintaining either of the booms rigidly stable, against tortional strains, when in an active towing but otherwise retracted position. Such a position would be assumed, at least temporarily, during each burden transfer.

Booms 140 and 140$^a$ may also have bell-crank members 159 (see Fig. 3) linked by pivot-pins 160 to the plunger rod 161, which rod operates automatically in connection with the shock-cylinder 162, as also see phantom 162$^a$ in Fig. 2, which additionally shows the schematic fixed pivot point 163. Such shock-struts or cylinders are well known in the art of shock-absorbing devices and need not be described in detail . . . they being usually operable pneumatically, hydraulically or hydro-pneumatically. A simple pneumatic cylinder, comparable to pneumatic door checks, having a rearwardly disposed bleeder valve, would probably suffice in this instance. Or any satisfactory alternative mechanism may be employed whereby to delay and ease the sudden thrust of crank 159 and rod 161 when actuated by the swingable movement of boom 140, for example, as it automatically or otherwise retracts about pivot-point 164, which can be most clearly seen in the detail of Fig. 3.

Several varieties of booms, with complementary hook devices thereon, have been devised for employment in other kinds of pickup services (as, for typical examples, see Figs. 1–4 in Patent No. 2,359,275 to R. O. Anderson; Figs. 1, 6 and 7 of Patent No. 2,373,413 to S. C. Plummer; and Figs. 1, 2, 3 and 8 of Patent No. 2,373,414 to said Plummer). Both boom 140 and hook 139, however, include new and novel features which are inherently different from such existing art.

Thus, referring to Fig. 5, the lower shank of boom 140 (in partial phantom) which may be identical with booms 140 and 140$^a$ of Fig. 2, has the particularly versatile hook 139, the latter being, in another modification to be hereafter explained, adapted also for employment with certain tow-room tackle shown in Fig. 3. Those features, however, which relate expressly to the tackle in Fig. 2 include a jaw 165 which, in the position seen in said Fig. 5, is adapted to receive and to non-yieldingly hold the tow-loop 166 at tension in a manner to be fully explained hereafter. But in another relation, jaw 165 is adapted to open outward along the dotted-line arc to position 165$^a$, thereby automatically releasing loop 166 as indicated by phantom figure 166$^a$.

This action is made possible by an arrangement whereby jaw 165 is integrated with a lock-plate 167, the unified jaw and lock-plate having limited two-way rotation about the pivot pin 168; which pin is suitably anchored within a terminal extension of the hook shank 169 in the form of a yoke which straddles said unified elements 165 and 167, since it also defines a slotted recess therefor upwardly to the dotted line 170. Outward movements of jaw 165, however, are responsive to the pull from loop 166 and against a torsion spring 171 which is seen, in part, through the broken away portion of the lower yoke of shank 169 on one side. Spring 171, of course, is of a strength to automatically, instantaneously return the jaw 165 to its former loop-receiving and loop-holding position upon the release, by election, of loop 166.

Hook 139, however, is provided with an efficient safety lock against premature actuation from any normal pull of the tow-loop; said lock being comprised, mainly, of the lock-bar 172, which is integral with lock-plate 167, and the slide-bolt 173 the lower end of which is clearly seen to rest in abutment with the upper end of lock-bar 172 in the safety position; said slide-bolt having also the elongated portion which is adapted to project downwardly alongside of bar 172 as shown. Slide-bolt 173 has limited movement within a slotted track therefor, whereby to partially recess the bolt within shank 169 as specifically indicated by dotted line 174. The 2-way movements of bolt 173 within this slotted track are limited by the duality of stop-pins 175 and these, in turn, are anchored as indicated in shank 169—there being, of course, a key-slot extending entirely through a predetermined section of bolt 173 of the required width and length for its normal movements relative to said pins 175. This slot cannot be seen in the side view of Fig. 5 but its general configuration will be well understood by reference to the phantom figure 173$^a$, which clearly shows the hypothetical upper limit of movement of said slide-bolt in its withdrawn position.

Withdrawal of the bolt, by election only, to release jaw 165 and to free loop 166, is effected by jerking the pull-cord 176; and this will be the procedure whether hook 139 is carried at the end of boom 140, as earlier explained, or is employed apart from the boom as explained hereinafter relative to the tow-room tackle of Fig. 3. When hook 139 is integral with boom 140, the pull cord, on passing through ferrule 177 and thence through the flared opening of the recessed tube 178, and through said tube to a suitable outlet therefor inboard of the tow-plane (as, for example, some point just short of the pivot-point 164, Fig. 3), may be provided with a brief extension (not shown but similar to line 176$^b$, Fig. 11, as hereafter described) in the form of slack-line as an assurance against the application of any tension thereon until the exact moment decided on by the operator. The tow-cord is merely given a sharp jerk at the area of said slack-line when it is desired to throw open the jaw 165. Phantom 176$^a$ indicates the continuation of the pull cord through said tube 178 to said inboard position, as explained. Ferrules or metal straps 179, at spaced intervals, are merely for retaining the tube 178, in this form of assembly, within the grooving provided therefor.

It is advisable that bolt 173 shall return instantaneously to its interlocking position, relative to element 172, after the recovery of jaw 165 responsive to spring 171. That is, upon release of tension on pull-cord 176 by the operator; and while this result may be delayed as elected, the operator may turn loose of said cord a brief instant after the release of loop 166 because of the aforesaid snap-action of spring 171. Similarly, when the pull-cord is manually released, the slide-bolt 173 will also be snapped shut by the action of a compression spring 180, operating in the inner sleeve 181, said spring being suitably anchored at one end to a finger 182 which is seen to project into inner sleeve 18 from the upper end of slide-bolt 173, adjacent its coupling with the pull-cord.

The other end of spring 180 may merely bear against the upper end wall of sleeve 181. However, as an insurance against any possible premature return of bolt 173, before element 172 has duly recovered, it is provided, optionally, that the arcuate guide member or so-called "spur," at left, which is securely integrated with element 172 in the manner shown, may be of such length as to not entirely clear the slotted away portion of shank 169, below the line 170, when describing its own arc along the line 183 about pin 168.

Element 184, incidentally, is in duality and is an extension from both lower sides of the yoke as joined by pivot pin 168; and, while there is ample spacing between these two yoke members for freedom of limited rotative movement of the bar 167 therebetween, there may be upper inward projections thereon, or an upper bridge—not shown—connecting the two sides of element 184, whereby to act as a stop to bar 167 on the return stroke, as indicated at the abutment point 185, where it contacts the lower side of a support member for said spur. The spring-latch 186, which yields initially to the entry of loop 166 behind jaw 165, is self-explanatory. To insure free movement of bolt 173 relative to bar 172, against the possibility of one fouling the other, their respective ends are slightly beveled approximately as shown.

Although, necessarily, hook 139 calls for a detailed description in order to present a clear understanding of its different working parts, the same is actually a relatively simple device, positive in its action, and seemingly foolproof for the exacting service demands to be imposed thereon.

As previously mentioned, hook 139 may be used apart from boom 149, in which case the shank 169 can be terminated with the eye 186', and tube 178 may end abruptly at arrow pointer 187, the pull-cord 176 also ending a very short distance thereabove (according to this preferred option) in the terminal 188. And terminal 188 may be connected in any preferred manner to the auxiliary pull-wire 189, the exact function of which will be explained directly in relation to Fig. 3. Eye 186' is coupled to a terminal element 190, which is preferably a small but very strong snap-hook swaged or otherwise affixed securely to a length of cordage 191. Referring again to Fig. 3, cordage 191 is seen to constitute a single tow-line adapted to be carried in one direction through the sheave-wheel assembly 192 (similar to elements 154 in Fig. 6) and thence over drum 152 of winch 153. Element 192, incidentally, is not really essential for any of the brief operations described relative to drum 152, especially wherein employed in the "take-over" duties to be detailed shortly. It will be included for the present, however, since adapted for use in duties conveniently defined as the "hand-over" operations.

As mentioned in connection with Fig. 6, drum 152 and winch 153 (if not separately mounted) may be regarded as the schematic equivalents of the composite assembly of like elements shown in Fig. 6. For present purposes, therefore, it will be assumed that drum 152 is the fourth component, only, of the aforesaid multiple automatic winch—in short, drum $D^4$—which is usually in stand-by relation except when employed at such times as one, two, or all of the lines $G^1$—$G^2$—$G^3$ are being transferred. Line 191 may be quite short, as compared to lines $G^1$—$G^2$—$G^3$ leading to the gliders of similar designations, as will be well understood shortly.

Carried from snap-hook 190 at one end of transfer line 191 is the transfer hook $139^c$, substantially as indicated in Fig. 6. The pull-wire 189, running from the pull-cord terminal 188 to a small reel 201 or the like, is obviously the means for manually actuating the slide-bolt 173, as earlier detailed in connection with Fig. 5 (reel 201, of course, being supported at any convenient, preferred location therefor inside the tow-room).

When it is desired to transfer one or more of the gliders in mid air, and without necessarily slowing either the tow-plane or the gliders, hook $139^c$ will be employed in cooperation with another fixture which may be constructed in various ways but which, for the sake of clarity, is shown in the form of the transfer harness 202, Fig. 6a, the same comprising a closed ring member 203, flattened and spread somewhat at one end and to which is swivelly connected the pin 204. Pin 204, in turn, supports the block 205 from which is carried a plurality of snap-hooks 206, which are preferably also swivel-mounted at distances apart substantially the normal distances of the rings R of Fig. 6 from one another, when occupying the inboard positions there shown. (If desired, snap-hooks 206 may append from short lengths of chain or cable; or see optional harness 218 of Fig. 16, as well as Figs. 18a to 19b explained hereafter.)

*The switching operation*

The rig-up or make-ready for a transfer operation, assuming that all three of the gliders are to be handed over from plane $P^2$ to plane $P^1$, consists in first reeling in the glider lines, as explained, until rings R are correctly disposed abreast of each other. Harness 202 is then thrust upward, with hooks 206 upturned, and each of these hooks is snapped over one of said rings, which is nearest contiguous thereto, and ring 203 momentarily allowed to hang downward. Next hook 207 of the very short anchor-line 208, affixed to one of the stanchions 155 by means of any suitable eye-and-Crosby combination or the like, as shown, is snapped into the harness ring 203. Next the multiple winch is operated to slowly pay out all three glider lines simultaneously until anchor line 208 is at tension and carrying the entire tow burden in conjunction with hardness 202, lines $G^1$, $G^2$ and $G^3$ having now become sufficiently slack to allow of the rapid unhooking of terminal hooks $T^1$, $T^2$ and $T^3$ from the rings R. Next the snap-hook 151 of the transfer or loop-line 137 of Fig. 3 (not shown in Fig. 6) is grasped and the inboard section of said loop-line which was wound around fixture 149 is removed and hook 151 snapped onto ring 203 of the harness adjacent hook 207 of the anchor line, Fig. 6. Next the transfer safety hook 139c is also snapped over ring 203 on the other side of hook 207.

With these preliminaries disposed of, and at a given signal indicating that tow-plane P¹ has arrived (or will shortly arrive or be overtaken) with its boom 140 extended and its own similar boom hook 139 in readiness for engagement with cross-cord 126 of line 137, Fig. 4, as earlier explained, any suitable actuator device is operated to snap the duality of standards 124 into their correct loop-supporting positions, the snugger 150 of Fig. 3 being shortly thereafter moved out of the way to permit outboard movement of line 137 from its position relative to the position 209, Fig. 3, of ring 203 to the position 137ᵃ of said line relative to the outboard position 203ᵃ of said ring 203 as indicated. Or snugger 150 could be replaced by a simple break-out clip and line 137 allowed to free itself therefrom automatically. Before such outboard movement is permitted to occur, however, the stand-by or transfer drum D⁴, and this drum only, is operated to first draw in the harness 202 just enough to bring the entire tow-burden onto line 191 and transfer hook 139c, at which instant—anchor line 208 having become slack—hook 207 is removed and drum D⁴ again operated to correctly position harness 202 for the actual transfer.

That is, harness 202 should not be so far away from stanchions 155 as to produce a premature tension on the loop-line 137, such as to break out the cross-cord 126 from clips 141—including optional additional clips 142, Fig. 4—since such action must occur only after actual engagement of the boom hook 139 of plane P¹. The precise adjustments required between the several named components can be readily worked out according to the design of the tow-room itself and other variables.

Obviously, line 137 is not in the first full tension position 137¹ until an instant after hook 139 of plane P¹, flying at approximately an equalized speed with respect to plane P², has snatched away the loop 126 and has then moved forward just sufficiently to bring ring 203 of harness 202 into position 203ᵃ—line 191 being payed out as required, coincidentally. In order to produce a hypothetical minimum of shock on line 137, however, and therethrough to plane P¹ at the instant of transfer, it may be desirable to pay out sufficient additional footage of line 191, from drum D⁴, until said harness is approximately as shown at upper position 202ᵃ—or to the yet higher location schematically indicated at 202ᵃᵃ.

The switch from plane P² to plane P¹ is now made instantaneously, upon a given signal (by radio telephone, for example) to the master tow-pilot in room 145, who merely exerts a sharp tug on the pull-wire 189 to unlock jaw 165 of transfer hook 139c. Harness 202 is thereby freed instantaneously from all remaining connection with plane P², swinging upward as indicated by the transitory position 202ᵃ; boom 140 of plane P¹ is automatically pulled further backward along the arc 209 of Fig. 2 through transitory position 140ᵇ and thence quickly to the fully retracted position 140ᶜ; during which brief interval the shock-strut 162ᵃ operated to damp and smooth out the slight take-up jerk which may have occurred before all three of the gliders were in fully towed relations from plane P¹. It is probable that, by expert handling, this jerk can be entirely avoided.

(Parenthetically, Fig. 2 also serves to illustrate how boom 140 of plane P¹ may, by option, and by obvious adaptations, be swung both rearwardly along arc-line 209 and forwardly along arc-line 209ᵃ whereby to effect delivery of a burden line, and thence a burden of suitable size appendant thereon, through hatch H into the interior of the airplane.)

On release of transfer hook 139c from ring 203, of course, the former will drop and trail outboard from the tow room until hauled aboard. And standards 124 can be retracted by remote control to their former positions within grooving 131. It is not deemed essential to show the specific means for retracting the standards, except as to earlier reference to elements 129 and 130 of Fig. 8, as such a matter is quite elementary, and the necessary arrangement can be supplied to order immediately by sundry designers in accord with my disclosure.

Plane P² can be made ready to take over another tow by operating its own boom 140ᵃ as required, or, on long range schedules, may, after first operating its flight controls to quickly drop downward entirely out of the way of the presently constituted glider train, proceed thence to the relay station for refueling or for any other disposition as predetermined. With regard to plane P¹, however, the transfer operation is not yet complete, since all three of the gliders are still trailing from hardness 202 and the latter still connected, via loop line 137, to hook 139 of the retracted boom.

Completion of the transfer, according to one preferred technique, can be effected in the following manner, wherein the fourth, or stand-by, sheave-wheel assembly 192 of Fig. 3 may, if desired, be omitted; and, for this brief operation, the line 191 can be carried directly from stand-by drum 152 (equivalent in this instance to drum D⁴ of the multiple winch of Fig. 15). It is understood, of course, that the general arrangement of tow-room tackle is substantially the same on both planes P¹ and P². Element 192, if especially constructed, however, could be utilized, if it is assumed that the block which supports the same is a split-sheave or is otherwise adapted to be opened to free the line 191 for operation directly off the drum. Terminal 190, therefore—see Fig. 6—which in this instance is not presently connected to a transfer hook 139c, is first used to form a connection between line 191 (of plane P¹ of course, in this instance) and the end of the newly acquired loop-line 137, which is at tension across jaw 165 of boom-hook 139 in the latter's fully retracted position. The same will present an appearance, in general, as viewed at location 193, Fig. 3, or at position 139' in Fig. 4. The slot 157, moreover, terminates rearwardly in an opening in the tow-room floor, dimensioned to allow sufficient spacing on at least one side of the boom-hook whereby the master glider-pilot or so-called flight mechanic may readily reach down and snap hook 190 between the respective sides of the bight adjacent said jaw 165.

Drum 152 of Fig. 3 (drum D⁴ in Fig. 6) is now operated to bring line 191 into a taut position, in readiness to assume the full burden of the glider train, and jaw 165 is thrown open to release the loop line 137 entirely from the boom; at which instant the combined lines will merely jump upward slightly from the floor level of the boom-hook to the normal towing level relative to drum 152. The actual releasing act is performed by merely exerting a sharp tug upon the pull-cord 176, at the inboard position thereof previously explained in relation to Fig. 5, the weighted pull of the glider train completing the opening of jaw 165 as line is payed out somewhat further from drum 152 to entirely clear the boom hook.

If it is desired to lessen or to eliminate the upward jump of the aforesaid combined lines, the stand-by hook 207 and line 208, Fig. 6—which can be anchored very close to floor level but allowing for an upward preliminary inclination therefrom—may be employed during an obvious intermediary stage of the transfer operation, and disconnected thereafter.

It now remains but a simple matter to first wind in the entire upspooled length of line 191 over drum 152, inclusive of snap hook 199 as well as the loop-line until harness 202 is in handy reach within the tow room. Thereupon each of the terminal hooks $T^1$—$T^2$—$T^3$ can be quickly snapped into the tow-rings R, alongside of harness hooks 206—206—206, the lines coming off drums $D^1$—$D^2$—$D^3$ made taut to take over the respective glider burdens, individually, and line 137, which has become sufficiently slack, freed from ring 203 of the harness by merely removing the snap-hook 151.

For data concerning a somewhat more simplified burden-switching technique, reference may be had to my co-pending application bearing Serial No. 707,152. See also said latter application for a preferred method and means whereby to cast off the gliders from a tow-plane or a tow-car.

While the hand-over and take-over operation or operations just described had to do with the airborne switching of an entire train of gliders simultaneously, from one locomotive plane to another, the aforesaid technique may be modified in various ways. Suppose, for example, that only one of the gliders, say glider $D^1$, is to be switched from plane $P^2$ to plane $P^1$. In that case it would be unnecessary to use the harness 202, and a simple tow-ring, such as one of the rings R of Fig. 6, may be substituted therefor. Furthermore, it would not even be necessary to use the short anchor line 208; but instead, if it be assumed that the ring R, engaged by line $G^1$, is of adequate size to readily admit of the required plurality of snap-hooks at the same time, transfer hook 139c at the end of line 191, Fig. 6, could be snapped thereon alongside hook $T^1$, line $G^1$ could then be unspooled just enough to throw the tow burden on line 191 and to create enough slack in line $G^1$ to remove terminal hook $T^1$; and loop line hook 151, Fig. 10, could then be snapped over ring R alongside hook 139c. The remainder of the transfer operation may be performed thereafter in general accord with the method which was detailed wherein all three of the gliders were switched.

If two, only, of the gliders are to be switched, harness 202 may be employed, idling one of the snap hooks 206 and using the other two for connection with the rings R which are connected to the selected glider lines. Or a single tow ring of sufficient size (not shown), having strong, safety interlocking segments on one side and a hand-cuff type of hinge on the opposite side, could be locked into said rings R of said selected glider lines. Or—to mention yet another of the possible variables—a brace of sister-hooks, such as are well known in the marine hardware field, could be employed in a similar manner. In fact, harness 202, as specifically disclosed, is not at all essential in that particular form, since an equally efficient—and in some respects more desirable—arrangement (see also the similar device of Fig. 16) may readily be made up with either two or three short lengths of cordage (depending on whether two or three gliders are to be switched simultaneously) having snap hooks, such as hooks 206, at each of their ends, defined as ends A and B; the plurality of ends A being snapped over a tow-ring, such as any one of the rings R of adequate size, leaving the plurality of ends B free for snap-on engagements with the selected plurality of rings R in Fig. 6 in approximately the same manner as was explained in reference to the harness hooks 206 of Fig. 6a.

Sundry other options, and variations of technique, will readily occur to those regularly versed in such matters, in accord with the general instructions given herein.

In order to simplify the earlier description relative to Figs. 2, 3, 4 and 6, and for avoidance of possible confusion during the detailing of the somewhat complicated glider-switching means and modes, the three glider lines were referred to specifically as lines $G^1$, $G^2$ and $G^3$. This is correct if the lines are viewed in their entirety, but in reality, as will have been made quite clear by now, the master drum lines $G^1$—$G^2$—$G^3$ of Fig. 6, as carried over drums $D^1$—$D^2$—$D^3$, have subsidiary lines running from the rings R to the respective gliders. While most of the time, in normal towing service, it is easier to think of only three unified lines running from the master drums to the gliders, the aforesaid subsidiary lines are, in this preferred embodiment, separated entirely from the master tow-lines of one of the tow-planes, during a transfer operation, and are then re-unified with other master lines of a different tow plane. As it is now advisable to further describe these subsidiary lines, the same will hereafter be referred to expressly as lines 194, 195 and 196 . . . as see Fig. 6. And whereas the master lines have terminals $T^1$, $T^2$ and $T^3$, connecting them releasably to the rings R, the subsidiary lines have other terminals 197, 198 and 199 connecting the same releasably to said rings.

These auxiliary lines are carried from winch drums located in the gliders themselves, at least one to each glider; such as drum 200, for illustration, in the nose of glider 103 of Fig. 1. By this arrangement, it was possible to pay out or to reel in different lengths of glider line, in the case of any one of the gliders, to or from tow-plane $P^2$ or to or from the glider independently of the tow-plane; thus affording a greater degree of flexibility in glider operations with obvious corresponding benefits. For an example, one of the many utilities made possible by this arrangement is the fact that, if the master two-pilot (flight mechanic) of plane $P^2$ became injured, control could still be exercised by each of the individual glider pilots of a train. And in either war-time or peace-time operations, control could be electively passed back and forth, and in the case of a tow-plane having only one master winch-drum it would be possible to operate and to transfer any or all of the gliders comprising the train by a very slight obvious modification of technique. In such a case, most of the required lengths of line could be carried directly from the individual glider drums to a ring R, for instance, or some such fixture as harness 202, with only a relatively short single line being necessary on the drum of the towplane.

In the operations just described, it is obvious that in order to remove each of the glider lines from its particular master drum, so that all of the gliders could be switched at the same time, by briefly joining them with harness 202, it was necessary to reel in the master drum lines until only a short length of the same—running from the drums to the rings R—remained unspooled. But such an exact operation could not be performed, ordinarily, without benefit of the auxiliary lines, for the reason that the gliders should remain at proper distances from the tow plane and from one another. This requirement is readily met by having the pilots of the gliders operate the respective glider drums to unspool suitable lengths of line from each individual glider drum to compensate for the progressive withdrawal of the master lines, while maintaining proper distances and relations.

While such procedures have been detailed on the assumption that the gliders will have individual pilots, it is apparent that robot controls for gliders can be perfected to the point where the aforesaid towing and switching opertions, including the automatic spooling and unspooling of the auxiliary glider lines as required, may be safely and efficiently performed. (See, for example, the similar method and structure therefor in my last aforesaid application bearing Serial No. 707,152. While less preferable, for obvious reasons, it is apparent that by providing amply long glider lines, the rings R could remain inboard at all times, for switching purposes, and lines G¹, G² and G³ could merely have a common inboard terminal instead of separate drums as shown, a single drum being sufficient for effecting transfers.)

American patents have already been issued—such as Patents Nos. 2,399,215 to D. S. Fahrney and No. 2,400,400 to John Van Buren Duer to mention but two—which describe systems of automatic flight control for gliders; and to those regularly concerned with such matters it will now be elementary to devise means for operating the glider drums by remote radio control, or otherwise, as in the case of various mechanisms which have been devised for the control of so-called drones.

Spot landings and pickups

Other specific advantages in providing the tow-line drums on gliders 103 will now be explained. In many parts of the globe, especially in some of the so-called raw-material countries, it would be unprofitable to construct a system of modern airports, such as normally required for large passenger and cargo airplanes; but it will often be possible to establish small, widely scattered launching and spot-landing fields for gliders, where the latter can be readily picked up by the tow-planes, or by special pickup tugs, flying thereto from not very distant terminals. In accord with present modus operandi, gliders are picked up by tow-planes from ground stations with the aid of conventional tackle, which includes a pair of station poles similar to those used in air-mail pickups, as previously referred to. The aforesaid patents to Plummer and Patent No. 2,369,518 to H. W. Ballard, or Patent No. 2,402,918 to Arthur B. Schultz, may also be consulted in this connection. It is much handier, however, to provide each glider with its own pickup tackle, including both poles and loopline; so that at any time, at any satisfactory location, on a moment's notice, a glider can be snached from its own mobile, self-embodied "ground station." I provide, in short, that each glider 103 may have extendable-retractable standards similar to the standards 124 on towplane P₂, Figs. 2 and 4, for example, but with certain required modifications.

Thus, in Fig. 1, glider 103 bears on its upper wing areas a pair of standards 124ᵃ from which a loop-line 137 may be suspended, as, for example, in position 137ᶜ, whereby a pickup hook on boom 140, or its equivalent, appendant from a pickup tow-plane, may be readily engaged with said loopline. Immediately after the engagement, the initial shock can be damped out by providing such tow-planes with shock-struts similar to cylinder 162, Fig. 3, as earlier described. But, by option, delayed-action acceleration means may be supplied by an automatic pay-out of line from drum 200, instead of from the master drum on the tow-plane, since line 137ᵇ, as shown at position 137ᶜ, is carried forwardly across the nose of the glider into any suitable socket therefor 210 and thence to the drum; or to the drum via any required intermediary sub-tackle according to standard procedure. Line 137ᵇ, when in an idle position, could be normally disposed, out of the way, in a pocket similar to box 132, Fig. 4, and any of several obvious options may be employed.

Referring to the detail plan view of Fig. 8, for example, it is observed that the standards 124ᵃ may, if desired, be of such length that their tips can be received inside the box or pocket 132ᵃ, containing coiled loop 133, the remainder of these standards being adapted for retraction within slots 211 whereby to present a flush upper surface with the skin of the fuselage. Other features of box 132ᵃ have been previously described, and it is understood that standards 124ᵃ may be retractably-extendably mounted in any suitable manner, such as already mentioned in reference to standards 124 of tow-plane P², for instance. Ordinarily, for stationary pickups, wherein the tolerances must be much greater to allow for possible inaccuracies within reasonable limits, it is preferably to utilize these wing standards, since they may then be of considerable height and widely spaced.

As there is no disadvantage, at the time of the initial pickup, in bringing line 137ᵇ in an extemporaneous manner over the nose of the glider to any desirable fixture leading to drum 200, or to a lower inlet in the position of socket 212, Fig. 1, it may be found best to form the connection with the glider drum through said latter socket. However, wherein more than one pickup or "take-over" operation is contemplated on a given flight, as hereafter explained, it is possible that an additional glider drum 200ᵃ will be desirable. That is, drum 200ᵃ affords a more direct hook-up with the lower fixture 212, while drum 200 can pay directly to either socket 210, or, by option, to the fixture 213, which is conveniently shown as a ball-and-socket arrangement and may be more clearly seen in the slightly enlarged detail of Fig. 8; socket 210, in this view, being conveniently disposed directly thereabove. Alternatively, drums 200 and 200ᵃ can be mounted coaxially as independently operable components of a unitary automatic winch, similar to the device of Fig. 6, each of the drums feeding to a different tow-window, such as outlets 210, 212, or 213, and one of the drums being a stand-by unit while the other is on tow duty.

Standards 124$^a$ are normally, and primarily, disposed for initial pickup operations in lieu of ordinary ground poles but if desired they may be reserved for airborne switching as hereafter explained. For the latter service, however, as detailed later relative to Figs. 12 to 15 inclusive, there are provided the smaller auxiliary standards 127$^a$ earlier alluded to, including box 132$^b$, similar to boxes 132 and 132$^a$. These standards are normally used only in coordinated speed take-overs, and, therefore, need not be very large or widely spaced. And since they are, in this view, conveniently mounted to point toward each other along transverse areas of the fuselage skin, it is provided that each of these standards may be curved to the skin curvature, and they will normally occupy slotted grooving, similar to slots 211, when in retracted position.

While either the standards 124, 124$^a$ or 124$^b$ may be fitted with small flag beacons, according to ordinary mail and glider pickup procedures— the same being disposable within boxes 132, 132$^a$, 132$^b$ when not in active use—it is felt that in the deliberately executed "take-overs" herein described it will be quite sufficient to color the crosscords white or orange or bi-colored: particularly since it is provided, by option, that both the take-over plane and the glider may have any required rear-vision means for accurate close-up engagements of this character.

For example, a somewhat comparable arrangement is graphically shown in connection with the two tow-planes of Fig. 2, wherein the "take over" plane P$^1$ has the altiscope 214 extending downward from adequate view-reflecting means (not shown) in the cockpit; and said altiscope is provided with a sufficiently wide-angle lense to present a field (as indicated by dotted lines) which includes every detail of the transfer tackle which it is necessary for the pilot of plane P$^1$ to observe. Similarly, hand-over plane P$^2$ has the periscope 215 adapted to function in a comparable manner; and it is obvious that wherein such devices are employed on gliders their functions will be similar to those mentioned in connection with planes P$^1$ and P$^2$. Thus, if said periscope and said altiscope are fitted with wide-angle telephoto type lenses, and the cross-cords are distinctively colored, the flag beacons may be superfluous. For night-time take-overs, the cross-cords could be coated with standard luminous coloring materials. By focusing a suitably located spotlight thereon, adequate visibility should be readily obtained; and by option, fluorescent colors, instead of ordinary luminous paints and the like, could be used in conjunction with a beam or beams of blocklight, according to well known procedures; or infra-red colors used in conjunction with polarized goggles or lenses.

Since the individual gliders 103 of a train must first be launched, at one of the hypothetical terminals, such as an isolated take-off point, I also provide improved means for launching either one, only, or any correct plurality of the same; said means being conveniently coordinated with the glider tackle already detailed. Specifically, in Fig. 12, in addition to the booster motor M adapted to exhaust through nozzle 123 (as see also Fig. 1), I provide that control means for starting said motor may, by option, be suitably connected up to the standards 124$^a$; so that when the loop-line 137$^a$ is snatched by the boom hook 139$^a$ of the pickup plane, motor M is automatically actuated to start blasting.

For example, it would be quite simple to provide lower break-out clips (similar to clips 142 of Fig. 4, for instance) spring-mounted so as to be pulled forward retractably against tension springs (not shown) just a sufficient distance, before each break-out, to actuate the control hook-up schematically indicated by dotted line 216. Such control or controls can be quickly connected or disconneted whenever gliders 103 are being either dismantled or re-assembled, according to this optional procedure, along with other controls operable between motor M and the cockpit. Other obvious alternatives are possible. For example, actuation of motor M could be effected automatically by the initial pay-out of the loop-line from outlet 212; and the necessary facilities therefor are so elementary, within the common knowledge of various skilled and unskilled technicians, as scarcely to warrant detailed reference thereto.

The cone-shaped figure $n$, Fig. 13, merely indicates how glider craft 103$^1$ may be streamlined for transsonic and supersonic speeds, as, for instance, by tapering said nose portion $n$ to a suitable configuration, according to the possible future demands of tow-cars or tow-planes traveling within these speed ranges.

According to a preferred technique, I provide that the task of initially picking up individual loaded gliders need not be the function of the limited tow-planes. This could, however, be done satisfactorily, as will later be explained relative to Fig. 15, wherein it is possible to bring together all of the pre-loaded gliders of a proposed train at one take-off point: such as a modern type of landing and take-off field, adequate for the use of transglobal locomotive planes. It must be assumed, however, that such facilities will often not be available, and that one of the gliders to be loaded and later picked up will have to be spot landed, initially, at a hypothetical plantation A, for illustration, another at a plantation B perhaps 25 miles or more distant, while yet another would be dropped off at a plantation C within the general area of a particular terminal or "takeover" station on a "limited" route. When all of the gliders are loaded and ready according to schedule, and have so radioed to a predesignated airport, where better landing and take-off facilities are available, it is provided that the individual pickups may be effected by a special type of pickup plane operating, according to one preferred technique, as a glider escort or pilot plane as well as a temporary tender to the limited tow plane.

When the long-ranging limited plane is fully fueled and ready for the first leg of the transglobal route, such a pilot plane would normally speed swiftly from the terminal airport to plantation A, picking up a first glider, conveniently designated glider 103$^1$; and by the time the limited plane arrived, flying more slowly for the time being, the pilot plane, called plane P$^3$, will have completed the pickup and will be flying at a desirable altitude for switching the glider to the limited plane. This accomplished, plane P$^3$ will again speed ahead to plantation B, where the operation will be repeated upon arrival of the limited tow plane; and, after the third glider has been picked up at plantation C and handed over to the limited plane, the latter will then rise to normal crusing altitude and, at normal crusing speed, will proceed to the first relay station as previously explained; where all of the gliders will be taken over by the second limited plane in relayed series. Meantime, plane P$^3$, having transferred each of the gliders to the first limited plane, will ordinarily have returned to its base to await the arrival of the next limited plane. Or it could perform similar services over a relatively wide area of plantation country.

The exact pickup and hand-over operations performed by plane P³ will now be explained relative to Figs. 12, 13 and 14.

On arrival at hypothetical plantation A, plane P³ will lower its boom 140 to engage its hook 139ª with loop-line 137ª; Fig. 12 showing the relative positions of plane and glider a brief instant after hook 139ª, having traveled a path into the position shown, snatched said loop. It is obvious that various co-timed components of the launching operation will coact together to effect a smooth and rapid pickup. That is, the shock cylinder 152ª will cushion the initial backwhip of boom 140 and, coincidentally, line 137ª will, at the outset, be payed out freely from drum 200ª through fixture 212, while motor M, actuated by option from standards 124ª (by now already retracted), will have begun to blast through nozzle 129, having the effect of catapult action on the glider.

An automatic, delayed-action braking component associated with drum 200ª (not shown since well known in the art) will now begin to take effect; and as glider 103¹ is partially picked up and partially self-launched to the required height—an additional length of the loop-line 137ª having been payed out as required and then snubbed within the glider—motor M can be cut off and the transfer made at any time thereafter.

A small, compact liquid fuel rocket motor M is preferred for such service, but jato units, obviously, could be substituted therefor. In Fig. 13, glider 103¹ has just risen from the ground, while boom 140 of plane P³ is still outside its belly-groove. Briefly thereafter, however, after having payed out a suitable length of line 137ª, the glider may normally rise quickly to a desirable position above the wash of plane P³, as partially indicated by schematic tow line 137¹, in readiness for the operation depicted in Fig. 14. Here, however, it is conveniently assumed that the limited plane P² already has taken over a partial tow-train comprised of gliders 103¹-103², and that only a glider 103³ remains to be switched thereto. The switching operation may be the same in each case, however, and the great advantage of being able to hand over glider after glider—each heavily pre-loaded with cargo—to the partially burdened but fully airborne plane P² will be quite apparent.

At a predetermined moment, midget standards 127ª (see also Fig. 8) will be snapped to position 127ªª in the path of hook 139 at position 139ᵇ. Plane P² can then move very deliberately over glider 103³, to take it over, according to procedures previously explained, and the latter, of course, is still trailing from hook 139ª of pilot plane P³. The tow-line 217, however, which in this instance is assumed to pay off from drum 200 through the socketed ball member 213, will be first unspooled to a desirable length (following the engagement with hook 139, of course) and will be momentarily snubbed in this position.

At this juncture, the glider is trailing MOS (monkey-on-the-string) from both planes P² and P³ and between their respective slipstreams; and now, at a given signal, it is a simple matter to open jaw 165, Fig. 5, of hook 139ª of the plane P³ to release line 137ª, thereby disconnecting the pilot plane from the glider. The outboard portion of line 137ª will naturally swing backward underneath the glider, being preferably carried over a suitable pulley or sheave device (not shown) at the nose of fixture 212, and may be reeled in very rapidly. Details as to whether the looped end of this particular line should be reeled inboard (since not required again until the next transglobal transfer operation), or jettisoned, may be left for later determination.

Only the final operation of switching line 217 from hook 139 to its normal inboard position, for individual operation off of drum D³, for example (Fig. 6), remains to be accomplished. This is an elementary detail. According to one technique, each of the rings R may, in addition to the snap-hooks 197, 198, and 199 previously mentioned, have very short strands of cordage with similar snap-hooks affixed thereto—such as hook 199ª. With the drum-line G³ in a slack relation, it is quite easy to reach down and snap hook 199ª into loop-line 217 (which, of course, would be initially adjacent the floor level of the tow-room), operate drum D³ to take out the aforesaid slack, and, thence, open the jaw of hook 139 to swing line 137 directly to the drum. Any slight jerk which might be occasioned by such a transfer can be taken up by permitting a brief automatic pay-out from either drum D³ or the glider drum. And if a nylon tow-line of required type is employed, the natural elasticity of the line itself would no doubt damp out any potential shock to either the plane or the glider.

Such a technique, however, is not entirely essential. If desired, limited plane P² can take over all three gliders simultaneously. According to this procedure, which might be preferred in some circumstances, it will be assumed that plantation A has a total of three fully loaded gliders awaiting either the pilot plane or the limited tow-plane. According to one method, all three of the gliders could be picked up simultaneously by plane P³ and transferred to the terminal airport to await a ground launching by limited tow-plane assist, or, preferably, the limited plane itself could snatch all three of the gliders from plantation A and proceed on its journey without benefit of pilot P³ and without having to make a landing of its own and a subsequent take-off. This method is as follows:

Gliders 103¹, 103² and 103³ are arranged in proper positions relative to one another, it being conveniently shown, in the drawing of Fig. 26, that glider 103² is in a centermost location and flanked on either side by gliders 103¹ and 103³. It is only necessary to utilize the embodied pickup standards of one of the gliders, say glider 103², since, in this illustration, it will be assumed that the motor M of each glider is adapted to blast automatically upon actuation by the first rotative action of the respective drums 200ª at the instant that tension occurs on the glider lines 194, 195 and 196. Other means for automatic actuation of the motors is optional, and the exact arrangement of the gliders will be governed by the choice of technique to be employed. It may be found desirable to first launch one, or possibly two, of the gliders simultaneously, in positions best adapted therefor, the other or others following, or the preferred mode may be to have all three take off together as soon as possible after contact with the pickup hook. In either event, all three gliders may be hitched together by means of any suitable harness, such as harness 218, Fig. 16, or harness 202 of Fig. 6a.

Harness 218 comprises merely the ring member

R¹ into which has been interlinked the three terminals 219 of lines 194, 195 and 196. In this particular arrangement, which is presented to indicate another of the sundry possible variants which may now and hereafter be improvised, each of the terminals (snap-hooks) 219 may have an anomalous eye 220 thereon, the function of which will be shortly explained. First, however, with reference to Fig. 15, it is apparent that the limited tow-plane P² has already passed over the target which, in this case, was the upper crosscord of loop L of the loop-line 217; which line was initially attached releasably to the pickup standards of the centermost glider 103² at position 124ᵃᵃ. These, of course, are the wing poles 124ᵃ of Fig. 8, and were automatically, instantaneously, retracted back into wing slots 211 as soon as the loop was freed therefrom.

Originally all of the lines 194, 195 and 196 (in Fig. 16 they are faced opposite to their positions in Fig. 15), being then momentarily released from any actuating element adapted to start the motors M, were snapped over ring R¹, which was normally closest to the nose of the central glider 103². Line 217 was then connected to ring R¹ by means of snap-hook 221, the other end of this line terminating in the loop L, which was affixed to the standards or wing poles at position 124ᵃᵃ. Upon later actuation of all three of the motors M, as explained, a simultaneous blasting will take place through the nozzles 123, assuming that this procedure is followed. According to predetermined, synchronous action between the respective drums 200ᵃ, relative to the pull exerted on all three glider lines simultaneously, and in coordination with the thrust components of motors M, as well as the tug exerted by plane P² on the master tow-line 217, the train will move rapidly forward—the glider lines having been progressively snubbed by delayed-action braking—and a relatively brief launching in triplicate will occur with all the glider lines having been finally braked therefor.

It is understood, of course, that plane P² has a shock-cylinder 162ᵃ, Fig. 12, or its equivalent, associated with boom 140, which cushioned the initial engagement between the snatch hook 139 and loop L. Naturally the different components must be well coordinated and this technique may call for the exercise of considerable skill on the part of the master pilot and each of the glider pilots.

When the gliders have risen to the desired airborne positions, they may be each removed from the master tow-line 217 in the following manner: First line 191 (of Fig. 6) in the tow room of plane P² is made ready, as required, for operation directly off the stand-by drum D⁴, and its snap-hook 190, being now freed from the abbreviated type of hook 139ᶜ, is fastened to that area of loop L which is directly adjacent the boom hook ... from which all the gliders are still being towed. Drum D⁴ is then operated to produce a tension on line 191, and pull-cord 176 (as at 176ᵃ in this type of boom—see Fig. 5) is jerked to free loop L from the boom hook, bringing the entire tow-burden directly onto drum D⁴. The latter is then operated further to bring the harness assembly 218, Figs. 15 and 16, inside the tow room, only a short length of the master loop line 217 now remaining unspooled from said drum and the respective glider lines proper having been further payed out as required to maintain the correct airborne relations of the gliders.

It is easy, now, to take hold of each of the terminals T¹, T² and T³, which have been at slack positions, and snap them into the respective anomalous eyes 220 of the hooks 219. Once this has been done and lines G¹, G² and G³ have been tensed, hook 221 of line 217 may be removed (after operating drum D⁴ to slacken this line), leaving only the ring R¹. And ring R¹ may be of such ample size as to be worked free from one of the hooks 219 after another by merely operating the catches, since such operations will have no effect upon the newly assumed relations between the drum lines and the three eyes 220. Phantom figure F is an hypothetical tow-cab at the upper level of a so-called cage to be later explained relative to Fig. 9 (see also Fig. 1), which merely illustrates another possible launching technique.

Needless to say, by thus transferring the individual glider lines 194, 195 and 196 directly to respective drums D¹, D² and D³, instead of maintaining all of the gliders from the one master line 217, many very evident advantages are gained, not the least of which is the fact that the movements of a particular glider will have no direct modifying effect upon the others, as would be the case through the master connection. The limited plane P² may now proceed at regular cruising speed to the end of the first leg of the transglobal route, at which point a freshly fueled tow plane will "take over" in the manner earlier detailed in reference to planes P¹ and P² of Figs. 2, 3 and 4.

It may be mentioned, at this point, that while wing standards 124ᵃ were employed, on glider 103² only, for the triplicate launching operation, the smaller standards 127ᵃ of Fig. 17 may be used later, by option, in case that a particular glider is to be separated from the remainder of the train, as will be more especially detailed hereafter relative to the airborne take-over operation seen in Fig. 7. It is apparent, incidentally, that whereas the loop-line employed in connection with wing standards 124ᵃ may be carried forward in any convenient manner, as, for example, to the lowermost pay-out fixture 212 (Fig. 1, etc.), the line L², running from standards 127ᵃ of Fig. 8, is adapted to be closely drawn down within a groove G, which may extend all the way from box 132ʰ, and even centrally through a brace member 222 of windows 223; then, by option, into a skin socket 210, and thence to the drum 200 of Fig. 1. Or instead of entering socket 210, it may, alternatively, be connected to said drum via the socketed ball 213, Figs. 1 and 8. Any of sundry designers can readily supply the details for elements related to ball 213: such as, for one example, and by ready adaptations, a structure comparable to the ball-and-socket elements in the assembly of Patent No. 2,396,453 to Windle.

*Airborne-railborne combinations*

I come now to that form of the intercooperative system whereby the respective airborne and railborne components thereof have new and novel relations therebetween. In short, I introduce relationships between carriers traveling in full airborne positions, at normal airborne speeds, and other carriers traveling on surface trackage at similar speeds. Thus in one of the possible embodiments I disclose, as a new mode of transport, the glider 103—being one, only, or one of any preferred plurality of the same—trailing from the two-cab 224 of railcar 225 of Fig. 9. (Obviously, in the case of an entire train of cars, there may be other two cabs, at desired intervals, each towing one or more other gliders.)

The latter structure, however, will be described more fully in relation to the larger view of Fig. 9; wherein said car 225, supported on trackage 61 by wheels 15 of dollies 60 and surmounted by stabilizer dollies 62 within the lower bank of a partially broken away cage 23, bears the particularly sturdy tow strut 226. Surmounting strut 228 is said tow-cab 224; as additionally supported by dollies 60ª, having right and left wheel elements adapted for contact with upper rails 64.

Detailed distinguishments, however, include such tackle elements as the hook 227 of boom 228 of the two-cab and standards 229 of two-plane P⁴; which are comparable to standards 124, 124ª, 127ª of Figs. 2, 3, 4 and 8 but in an inverted position. As more clearly seen in the rear-end detail view of Fig. 10, standards 229 are appendent from pivots 230 suitably recessed on the undersides of right and left stabilizer fins 231, where they do not in any way interfere with the elevators 232 or rudders 233 on this preferred, twin-tail type of empennage. Obviously, the standards 229 will describe the arcuate figures 234 when extended and retracted; and when fully retracted will occupy right and left grooving as indicated at position 235.

Other positioning is quite possible, however, as exemplified by phantom standards 229ª, which may be conveniently pivoted, for instance, to extend rearwardly from the opening to two-room 145; from which pivoted location they may recess within skin grooving 236, and having tips 229ᵇ which may curve upwardly so as to protrude just above the flooring at the rear end of the two-room for handy access in making manual adjustments of the loop-line—similar to loop 237. Loop 237 could of course be similarly adjusted by merely lengthening standards 229 so that the breakout clips 141ª would, upon retraction, protrude through suitable small apertures at points indicated approximately by arrow pointers 239 and 238. These apertures could communicate with slots 239, to be explained immediately.

In the arrangement shown, however, which includes also the auxiliary clips 142ª—similar to clips 142 of Fig. 4—the upper portion 237ª of loop 237 is, according to one option, adapted to extend partially into the tow-room through said slots 239, beyond which point the loop-line (here shown in phantom only) is seen to enter through an upper-lower sheave-wheel assembly and thence to a winch having the automatic delayed-action drum 241. However, an alternative—and perhaps preferred—arrangement will be described shortly. Normally, plane P⁴ need be little if any different from the locomotive planes P¹, P² and P³ earlier described, and may have a full complement of other tow-room tackle components such as seen, for example, in Figs. 3 and 6, and if found desirable, drum 241 could be but one of the drum components of the multiple winch of said Fig. 6. For present purposes, however, and for avoidance of undue complication in the small drawing, drum 241 only, is featured.

It may be mentioned, parenthetically, that plane P⁴, which is desirably equipped for general utility towing and switching operations, can also have the wing standards 124, comparable to standards 124 of Figs. 2, 3 and 4; and, on large tow-planes fitted with this type of empennage, could readily have such standards mounted for movement from pivots 242, whereby to recess rearwardly into slots 243 and to assume erect positions 244; so that box 132 (as also see Fig. 4) could be located much nearer or just inside the tow-room, and so that the quite similar loop-line 137ª (not shown but see also Figs. 3 and 4) would recess into groove 144 only a short distance before entering two-room 145 over pulley 146. The details of such an alternative arrangement can be readily worked out in accord with the instructions previously given.

Returning to the tow-cab 224, it is by now clear that a cooperable association is indicated between rail car 225 and plane P⁴ closely comparable to that explained earlier between planes P¹ and P⁴ of Fig. 2. That is, it is provided that two-burdens may, in one relation, be switched from the plane to the tow cab and, in another relation, may be switched from the cab to the plane. Since the detailed technique therefor is quite comparable to that previously explained, the same, as now applied to plane P⁴ and cab 224, will be readily understood after a further explanation of said cab. Referring, therefore, to the enlarged detail view of Fig. 11, it is noted, through the broken away portion, that tow-cab 224 has a tow-room 145ª within which is carried a multiple automatic winch W, having one or a desirable plurality of drums D; and for present purposes this winch structure may be assumed to resemble, in general, the detailed apparatus of Fig. 6, with the auxiliaries there shown. These, therefore, may also include a sheave-wheel component 154ª, and the boom 228 is observed to seat within an upper skin-slot 157ª, comparable to the slot 157, Figs. 9–11, of plane P², for example. And slot 158ª may terminate at 245 in a narrow aperture which enables the hook portion 227 of said boom to be received inboard of the tow-room.

Boom 228 has the bell-crank member 159ª linked at pivot 160ª to the plunger rod 161ª; and rod 161ª coacts with shock-cylinder 163ª in a manner similar to operations described with relation to like elements in Fig. 3, etc. Likewise, in common with boom 140, boom 228 has a pull cord 176ª, and the latter adapted for inboard actuation by means of the slack sectional portion 176ᵇ, as similarly mentioned relative to boom 140. Other features of boom 228, and especially hook 227, are comparable to those earlier detailed in respect to the alternative structures of Fig. 5, wherein, as previously explained, the hook component per se may be of identical construction whether employed apart from the boom (as in Fig. 6 relations) or integrally with said boom.

Rail car 225 has, by option, the rearwardly disposed turbojet motor M adapted to blast through nozzle 122ª, inclusive of faired intake ducts 11ª and 9ª, the latter for operations in conjunction with a forwardly disposed jet plant (not indicated), which could be another turbojet engine adapted to blast through nozzle 10ª, for thermodynamic braking, or it could be a small, compact liquid fuel motor operable for the same purpose but requiring no external feed. Jato rockets afford another alternative. Compartments 43¹, 44¹ and 45¹ may constitute removable cargo or passenger body subsections, or, for long-range towing duties especially, may be one or a plurality of demountable fuel containers.

*Plane-to-rail-car techniques*

Assume, now, that plane P⁴ has arrived from overseas at the continental terminal of the intercooperative system, towing a triality of gliders (not shown) identified by their respective tow-lines as gliders (and lines) G¹, G² and G³; and assume, further, that it is desired to hand over these gliders directly from the tow-plane to the rail car, for straight-on-through transport to an interior destination or destinations, and without having to land either the tow-plane or the gliders. The required procedure therefor will be similar to that already explained relative to planes $P^1$ and $P^2$ of Fig. 2; and to initiate such a switching operation, the pilot of plane $P^4$ radios ahead as to his location and estimated time of arrival, thus enabling the engineer of car 225 to start up and to quickly attain a desirable speed relative to the speed of the arriving tow plane. In Fig. 9 plane $P^4$, towing three gliders, has overhauled car 225 and has coordinated its speed thereto at substantially equalized speeds therebetween.

At about this juncture means (not shown, but of any suitable character therefor) are actuated to cause boom 228 to partially rotate upwardly to the approximate position indicated; whereupon car 225 may increase its speed to cause the cross-cord of loop 237 to engage hook 227 (see also Fig. 10); or, to be sure, a like result would occur if plane $P^4$ slightly reduced its speed. If it is assumed that cab 224 has advanced—relatively speaking—to the position indicated generally by phantom 224ª, then boom 228 will also have moved to position 228ª, having just snatched the loop-line. But said loop-line is still—according to this particular technique—slidingly engaged within notches 239. Consequently, car 225 would then drop back slightly and/or plane $P^4$ would move forward relative to the car; whereupon the loop-line would be pulled rearwardly from notches 239, which may slant downwardly as required to faciltiate this sub-operation.

The master transfer hook 139ᶜ on board plane $P^4$, having previously been engaged to the ring 203 of a harness 202, for example, as in the case of plane-to-plane switches, and a hook similar to hook 151 of Fig. 3 but terminating the loop-line 237, having also been snapped on ring 203, the said loop-line is now payed out to position 246 of the harness. Obviously, in this position, transfer hook 139ᶜ is at position 239¹ and the harness has assumed the monkey-on-a-string attitude relative to loop-line 237, position 237ᵇ, and to the master transfer line 191¹, similar to line 191 in the comparable method explained with regard to Figs. 3 and 6. The transfer hook 139ᶜ may now be released by a sharp tug upon pull-cord 189 (not shown in Fig. 10, but see side elevational views of Fig. 9, Fig. 3 and Fig. 11) to release the tow burden entirely from plane $P^4$ to the tow-cab of car 225.

It should be mentioned here that since the inboard portion of loop-line 237 is not so readily gotten out of the way, within tow-room 145, when not actually needed for burden-switching, the same may have three separate portions: namely, a right and a left inboard portion, which are united as one to form the outboard loop, and an inter-connecting inboard portion bearing—normally at the center thereof—the previously mentioned hook defined as being similar to hook 151 in Figs. 3 and 6. The right and left inboard portions are conveniently fitted with small rings, which may be hung upon any suitable peg or the like on respective inner walls of room 145 when not in active service.

When required for making up the complete loop, these rings are removed from the pegs and manually engaged by snap-on terminals at the two forked ends of said interconnecting portion remote from said lately mentioned hook. These rings are depicted in Fig. 10 as being to the right and left of the forwardly disposed harness 202. In this small rear view, no attempt is made to show the glider-lines $G^1$, $G^2$ and $G^3$, which take off forwardly from the three elements 206 (Fig. 6a) as indicated quite briefly in said Fig. 10. Both the aforesaid interconnecting segment and the harness may be merely set aside or hung upon the wall until required for transfer duty as explained.

Naturally, each of the glider-lines were previously removed from their respective connections with the master tow-drums and were connected into harness 202 in readiness for the transfer, in the manner given for plane-to-plane switches. And the shock cylinder 162ª operated automatically to absorb any slight sudden jerk which may have been imposed on boom 228 at the instant of final transfer, in cooperation, as required, with the respective glider drums. That is, the latter could be set to automatically pay-out very brief lengths of lines $G^1$, $G^2$ and $G^3$, if required, to further take up the sudden lag and recovery, equivalent to what is known as a "surge" but in reverse action.

At this point, plane $P^4$ may leave car 225 and proceed elsewhere, leaving the completion of the switching operation to the master two-pilot in cab 224. (As already mentioned, one, only, schematic drum component 241 is shown in Fig. 10; but wherein a plurality of gliders are to be switched, the tackle elements of Fig. 6 may be used and the same are by now self-explanatory.) Lines $G^1$, $G^2$ and $G^3$ may be removed thereafter, at any time, from hook 227 and transferred to master drums $D^1$, $D^2$ and $D^3$ of the tow cab, comparable to like elements in Figs. 3 and 6, by substantially repeating the method earlier detailed relative to planes $P^1$ and $P^2$. Thus, in the fully switched positions, the gliders will be trailing as indicated by their respective tow-lines at $G^a$, $G^b$ and $G^c$, Fig. 9.

Element 247 indicates a retractable altiscope whereby the pilot of plane $P^4$ may obtain a clear view of the operations relative to loop-line 237 and hook 227; and element 248 indicates a periscope on cab 224 for the use of the engineer or co-engineer of car 225 for a similar purpose. The dotted line 249 indicates means of instantaneous communication between the co-engineer in the tow-cab and the engineer in the main cab therebelow; and, if found preferable during these operations, remote control of motor M of the rail car could be transferred temporarily from the main cab to a control board in the cab of the co-engineer.

Element 250 indicates, by option, a pair of standards which may be fitted on the upper sides of cab 224 for operations comparable to those earlier described relative to wing standards 124 and line 137 of Figs. 2 and 3. That is, whereby burdens may be transferred from car 225 to plane $P^4$ in a manner exactly the reverse of the method just described. Obviously, wherein it would be at all profitable to do so, small parcels and like burdens could be similarly transferred from car to plane or vice versa. The dog or pawl 251, Fig. 11, is positioned to engage against the adjacent shoulder member whereby to stop boom 228 automatically in the preferred outboard position 228ᵇ preliminary to engagement of hook 227 with the cross-cord on standards 229.

According to some schedules, it may be desirbale for the gliders $G^1$, $G^2$ and $G^3$ to be again switched from car 225 to another plane, similar to plane $P^4$, for transport to an off-route destination or destinations. In that event the operation may be readily carried out according to the plane-to-plane procedure, utilizing a master transfer hook 139c and pull-cord 189 in conjunction with a harness 232, Fig. 11, as well as standards 250, Fig. 9, in accord with like and other tackle components already mentioned in regard to Figs. 3 and 6.

Element 4ª of Fig. 7 indicates how, by option, gliders being towed at high speeds may have auxiliary flight motors in addition to booster units mentioned previously.

Variable other techniques

While I have described one preferred method of glider "hand-over" and "take-over" from plane to rail car, and at approximate co-velocities, it may often be preferable or necessary to land a train of newly arrived gliders while awaiting the arrival of the next rail car 225 having a tow cab thereon. In short, glider trains may frequently reach a given terminal off schedule from overseas, after fighting storms which delayed their arrival. Under such circumstances, it would be unprofitable to hold up a tow car indefinitely and, more likely, it would be best to land the gliders and hold them in waiting until the next scheduled arrival of a tow car. Again, at a hypothetical terminal, such as Los Angeles, many gliders would be initially loaded at that industrial center for transcontinental flights by rail car tow. In such cases, and as previously intimated, the terminal station could readily provide wide aprons or the like 111, as sectionally indicated in Fig. 1, extending longitudinally at upper right and left sides of the aforesaid cage and long enough to provide satisfactory runways.

Thus, while not so indicated in Fig. 1, it is obvious that a cage of such description, for accommodation of rail car 225 of Fig. 9, could be built as a partial support for such a runway, and having, of course, an open throat section therethrough for the movement of a tow-strut 226 supporting the cab 224. See phantom F in Fig. 1. The gliders of a train could then be arranged on right and left sides of said open area, and, after being duly connected to the towing apparatus in tow-room 145ª, would be launched by the rail car.

With reference to Fig. 9, it would appear possible to launch gliders from suitable right and left runways at ground level, if the individual gliders could be maintained at a required distance from the rail car cage until take-off. And a comparable technique might be possible for landings.

Other modifications

It would be unprofitable to dwell at length upon sundry of the minor refinements and adaptations which are now possible, in view of my general disclosure. For examples, the harness structures of Fig. 6a and Fig. 16 could be changed in numerous ways, as but briefly further indicated by the arrangements of Figs 19a and 19b. The same are self-explanatory. Optional types of transfer tackle are another case in point. Thus, while the so-called loop-lines, as earlier defined in relation to various figures of the drawings, are preferably separate from the tow-lines, mere specific avoidances of such exact combinations are readily possible if that is the end in view.

One such variant—which is, most obviously, but a simplified, less flexible but entirely operable form of the transfer tackle already shown—is seen in the small schematic view of Fig. 17. The obvious distinction here resides in the fact that the towing hawser 337 and the loop-line 338, including transfer loop 339, are not separate elements but are carried in continuity from the glider craft 340 to the schematic standards 341, where loop 339 is releasably held by clips 342 and 342, and wherein another, preferably stronger, break-out clip 343 may be employed to hold the outboard section of line 338 relatively taut while permitting such play as may be necessary during normal towing relations: in short, while the glider is maintained at towing tension from the master anchor-point 344, which could be any suitable stanchion or the like but is preferably an automatic winch.

In the drawing, element 189 is similar to the pull-cord of Fig. 11, for example, operable from any convenient reel 345; and transfer hook 139c may be identical with the like member of said Fig. 11 view. Ring 346, however, is integral with line sections 337 and 338, as explained; so that upon engagement of loop 339 by boom-hook 347, causing the composite tow-line and loop-line to be freed from clips 342 and 343, the short master line 348 may be paid out according to techniques previously given and the glider 340 freed entirely from line 348 by operating pull-cord 189 to open the jaw of hook 139c.

The fixtures of Figs. 18a and 18b, which are self-explanatory, illustrate two of the different ways in which such a composite tow-line and loop-line may be adapted also for cooperation with other elements featured in Fig. 17.

The embodiments of my invention, as herein presented, are subject to sundry changes, substitutions, etc., within the general scope of the disclosure; thus allowing considerable latitude for the exercise of mechanical skills and aptitudes for particular demands at particular times and for many individual preferences. But the true invention is not to be limited except by a correct interpretation and/or adjudication of the hereinafter appended claims.

I, therefore, claim:

1. In a new system of transportation, components in combination including: a duality of locomotive bodies traveling at coordinated speeds, one of said bodies having burden-handling tackle which comprises a winch, a master burden-line payable therefrom, and means associated with this line which connects it releasably to at least one subsidiary burden-line at the opposite end of which trails an airborne glider craft, in combination, to be switched in midair to the other of said bodies; a transfer line on said one of said bodies, said transfer line being releasable in its entirety from one locomotive body to the other and bearing a member operable to connect it releasably to said subsidiary burden-line, independently of the connection between the latter and said master burden-line, as well as a sectional portion which is releasably supported in the path of travel of line-engaging means extendable from the other of said locomotive bodies.

2. Transportation instrumentalities including, in combination: a surface vehicle; an airborne towcraft; at least one glider craft in towed relation to said towcraft; line means interconnecting the respective glider and towcrafts; glider-receiving tackle on said surface vehicle; and means associated with the towcraft to facilitate transfer of the glider as a tow-burden to said surface vehicle while traveling at coordinated speeds therebetween, said transfer facilitating means including a length of releasable auxiliary towline, a coupling element detachably interconnecting two segments of said first line means and to which coupling a terminal of said auxiliary line is also releasably connectable, together with means to support another portion of the auxiliary line in a position to be snatched by line-engaging means on the surface vehicle forming a component of said glider-receiving tackle; and means operable to relinquish both said coupling and that segment of the line means which extends between the respective glider and coupling elements from the remaining line segment on the other side of the coupling incidental to the action of said line-engaging means.

3. In combination: a length of railroad trackage; a vehicle traveling said trackage; an airborne towcraft; a glider craft releasably interconnected as a burden to said towcraft; and glider-receiving means—including a line-engaging member—on said vehicle coactive with burden-relinquishing facilities on said towcraft, which last includes a flexible hawser to be contacted by said line-engaging member.

4. In combination: a rollable vehicle having burden-switching facilities thereon, a burden thereon to be switched, and an airborne craft having burden-receiving facilities which includes an opening formed therein of a configuration to admit said burden entirely inboard of said craft; other components of said burden-receiving means comprising a member extensible from the aircraft into the path of travel of a burden-line supported releasably on said vehicle, and to one sectional portion of which line said burden is secured.

5. In combination: an airborne craft having burden-switching facilities thereon; at least one airborne glider craft, and flexible line tackle interconnecting it releasably to said first craft; and yet another airborne craft having burden-receiving facilities which include a line-engaging means extensible therefrom into contact with a component of said line tackle of the first named aircraft, to which line-engaging means the glider burden is entirely relinquished while in flight.

6. In combination: a first mobile body and a second mobile body, at least the first of which bodies is an airborne craft; said first body bearing a burden to be transferred to said second body and a burden-line connected at one portion thereof to said burden, another portion of said line being detachably secured to each of a spaced duality of spar members extensible generally downwardly from said first body in the path traveled by a line-engaging device which extends generally upwardly from said second of the bodies.

7. In combination: a first tow-locomotive, one or more airborne glider planes trailing solely therefrom as a tow-burden, a second tow-locomotive, and means for switching said tow-burden from said first to said second locomotive, said switching means including (on said first locomotive): a winch drum; a primary hawser having one end portion thereof connected to said drum and means on the other end portion thereof which readily releasably converts it to a coupling element occupying a position intermediary of said hawser and said burden; one or more subsidiary tow-lines respectively connecting each of said any one or more gliders to said coupling element; and a transfer line connected at one portion thereof to said coupling element and, at another portion thereof, supported releasably by outboard means therefor on said first locomotive in a position for its engagement by line-snatching apparatus extendable from said second of said locomotive.

8. In a glider craft, components including, in structure: (1) a first tow-line drum, a first set of pickup standards in spaced positions, and a tow-line having a loop section which detachably engages said standards, said line including a main reelable portion thereof connected to said drum; (2) a second tow-line drum in stand-by relation to said first drum, a second set of pickup standards for operation as stand-by tackle with respect to said first named standards, and yet another tow-line in stand-by relation to said first named thereof, said second line having a sectional portion releasably supportable from said second standards remote from the opposite end thereof normally connected to said second drum; the respective stand-by units being operable, in one relation, in lieu of said first set thereof and vice versa, and, in another relation, coincidental therewith upon engagement of said glider simultaneously by a duality of locomotive aircraft.

9. In combination: a first tow-plane having glider-towing and releasing tackle thereon and a glider craft in fully towed relation thereto; a second tow-plane; said glider craft having a first anchoring means thereon from which a tow-line extends to said first tow-plane, as well as glider-switching means including a stand-by tow-line having a loop portion thereof adjustable for co-operating engagement with primary glider-receiving tackle, including a loop-snatching member, extensible from said second named tow-plane for reciprocal glider-receiving and glider-relinquishing relations, respectively, between said first and said second tow-plane.

10. In a master transportation system, components including, in combination: (a) a first sub-system thereof comprising a plurality of glider craft a required number of tow-planes therefor, each of which tow-planes has means in structure for towing one or more of said gliders at a time over particular flight range, the total length of which ranges constitutes the first major segment of a transglobal course, and for facilitating the operation of switching said one or more gliders from itself to another thereof, at airborne speeds, adjacent one of a consecutive number of relay stations along said segment, there being a station at each of the terminals of said flight ranges; and (b) another major sub-system which includes surface rail trackage of a particular type and substantial length, a surface vehicle on said trackage and means for its propulsion at airplane speeds as well as means enabling it to receive respective relays of said one or more gliders at a time from particular tow-planes arriving at the junction point of said first and said another major sub-system, and, thence, to tow them along a succeeding segment of said course; each of said plurality of glider craft bearing means by which it may be switched in mid-air from one of said tow-planes to another, from one of said tow-planes to said surface vehicle, or from said vehicle to a particular one of said tow-planes within the fully comprehended system.

11. The oragnization of claim 10 which includes, in further combination: (c) a sub-system comprising at least one subsidiary tow-plane operating as a feeder craft and means thereon for receiving an airborne glider burden from said at least one surface vehicle, as well as for switching an airborne glider burden thereto for its transport to or from feeder territory served by the railroad component of said master system.

12. The augmented system of claim 10 which further includes: (d), yet another sub-system comprising at least one pilot plane operable to pick up the respective glider craft at known loading stations within said system, and to thence transfer such craft in mid-air to said first towplanes at known contact points therewith; said pilot plane bearing a full complement of tackle for picking up, towing and switching said gliders.

13. In combination: an airborne glider craft a glider-towing device, and tackle elements interconnecting said glider releasably to said towing device; said tackle elements including a winchdrum on at least the said towing device, a length of master tow-line payable from said drum, a terminal on the free end of said master line, a coupling to which said terminal is releasably attached, a second tow-line directly connecting said glider to said coupling, and means operable to free said terminal of said master tow-line from said coupling while at tension.

14. An intermediary means—called transfer harness—to facilitate switching of fully airborne a plurality of glider craft simultaneously from one glider-towing device to another, while towed solely by said first named device before said switching operation; said harness including: a coupling member to respective portions of which each of a plurality of glider tow-lines is individually releasably connectable; and said harness having also a portion thereof formed as means for releasably engaging the terminal of a master tow-line normally connecting the harness to said first mentioned glider-towing device.

15. The combination, with an airborne glider craft to be switched as a tow-burden from a first to a second glider-towing device, of transfertackle elements including a transfer hook associated with said second towing device; said hook comprising a main shank portion having a jaw portion which opens and shuts, and a jaw-locking device in structure with safety-release mechanism for operating the jaw portion, said jaw portion per se cooperating with subsidiary other means operable to urge it to its normally shut position with respect to said locking device, and said safety-release mechanism including a pull-cord and means to cause said locking device to move out of locking engagement with said jaw responsive to manually applied tension on said pull-cord.

16. In the operation of a transportation system, the method of utilizing respective towplanes and towable glider craft wherein: (1) at least one glider is towed by a given locomotive plane from a given station within said system, at which towing contact was previously made therebetween, to the proximity of a succeeding station en route, and (2) wherein said glider is thence switched as a tow-burden from said first locomotive plane to another thereof while each of said at least one glider and the respective said locomotive planes continues fully airborne.

17. The augmented method of claim 16 wherein (3) upon arrival of the duly constituted glider train at a given junction point, said at least one glider is switched in mid-air, as a tow-burden, from the last of said another locomotive planes to a surface vehicle operating along a length of railroad trackage.

18. In apparatus, designed to tow a plurality of airborne glider craft simultaneously, the structure including a plurality of winch drums having respective primary tow-lines connected thereto, an equal plurality of subsidiary tow-lines having respective terminals adapted to be connected to one, each, of a plurality of gliderburdens, and respective coupling members interconnecting the other ends of said subsidiary lines with the freely disposable terminals of said first primary tow-lines—one such coupling to each interlinked primary and subsidiary line combination.

19. The combination of glider-towing instrumentalities wherein each of a plurality of primary tow-lines is anchored to a separate towing winch but is also releasably coupled to a subsidiary tow-line extending from its respective coupling element to one of a plurality of gliders to be simultaneously towed; each of said subsidiary lines being retractively connected at its opposite end to a winch drum therefor, in combination, carried on one of said gliders.

20. The method of transferring an airborne glider craft from one airborne towplane to another which includes: releasably supporting one terminal portion of a subsidiary burden-line in an outboard position on the towplane to which said glider is already towingly entrained, and coupling another portion of said subsidiary line to a line-interlinking device associated with the primary tow-line; flying a second of the towplanes in close proximity to said first mentioned towplane while operating means thereon to snatch the releasably supported portion of said first mentioned burden-line to free the same for active tow-duty, and, coincidentally, disconnecting a substantial outboard length of said primary line—specifically, that portion which extends between the burden and said line-interlinking device—from the remainder of the glider-towing equipment of said first mentioned towplane.

21. In combination: an airborne glider, a plurality of airborne towplanes, a first tow-line extending interconnectingly between a first of said towplanes and a first line-engaging device on said glider, and a second tow-line extending interconnectingly between a second of said towplanes—independently of said first line—and a different line-engaging device on the glider; whereby the divided, respective components of tow-line pull applied to each of said lines is exerted solely thereon as between the respective towplanes and their common burden.

22. In a transportation system, the combination including: a duality of self-propelled bodies—at least one of which is an aircraft—traveling at coordinated speeds, a first of said bodies bearing a burden to be transferred to the other thereof; burden-relinquishing tackle on said first body, including a length of wholly releasable transfer line having burden-attachable means thereon, and further including outboard apparatus which releasably supports a sectional portion of said transfer-line, remote from its burden-attachable portion, in a position for its unimpeded contact directly by direct line-engaging means on the other of said bodies; and the said line-engaging means, namely: an element extensible retractively from said other of said bodies into direct contact with said supported section of the transfer line for its release from said outboard apparatus and, along with the remainder of this line and said burden, entirely simultaneously from the first of said bodies.

23. Apparatus comprising, in combination: a unit of locomotion, an airborne craft flying at a speed closely coordinated with the momentary speed of said unit, a glider craft, a main burden-line interconnecting said glider to said unit, an auxiliary burden line—called transfer line—associated with the said unit of locomotion, line-snatching means extensible from said airborne craft, means interconnecting one portion of the transfer line to said main burden-line preliminary to the relinquishment of both said main burden line and the transfer line, in their entirety, from said unit to said craft and other means on said unit to which another portion of said transfer line is detachably connected in a position for its contact by said line-snatching means of the aircraft.

24. In combination: an airborne towplane; a burden hook extensible therefrom; a plurality of stationarily disposed gliders to be launched coincidentally; a duality of pickup type standards on one of said gliders; a first length of master tow-line having a looped end portion thereof attached releasably to said standards; a master coupling member; a winch drum on each of the gliders, these drums having respective tow-lines wound thereon and said last-named tow-lines including respective outboard terminals individually connected to said master coupling member; and means by which the coupling member is, in turn, additionally connected to said first master tow-line remote from said loop, the releasably attached opposite end portion of which master line includes a stretched section of said loop—intermediary of said standards—in the path of travel of said hook of said towplane.

25. In a transportation system, the combination including a duality of towing devices A and B capable of coordinated speeds, at least one of said devices being a towplane; an airborne glider craft, towed solely by device A, to be switched therefrom to device B; a primary tow-line interconnecting said glider to device A; an auxiliary burden line on device A; a line-engaging device extensible from device B; a master coupling member; terminal means connecting one end of said primary tow-line to said master coupling; inboard means on device A to which the opposite end portion of this line is secured; another terminal connecting one end of said auxiliary burden line to the master coupling; and outboard means on device A to which the opposite end portion of the auxiliary line is attached, releasably, in the path of movement of said line-engaging element of device B, whereby, upon the release of said primary tow-line from the master coupling, said auxiliary line becomes releasable in its entirety from device A to device B.

26. In combination: a plurality of airborne glider craft; a glider-towing device; a winch thereon; a master tow-line payable from said winch, and adapted to extend rearwardly from said towing-device from a take-off point substantially aft of its center of balance, in a position normal thereto for range towing; a master coupling member; a terminal element which releasably connects the end of said master tow-line, remote from said winch, to said master coupling; subsidiary tow-lines extending from respective anchoring means therefor on each of said glider craft; and latch means, comprising a terminal member integral with the end of each such subsidiary line remote from its particular anchoring means, for enabling it to be positively, releasably, interlocked to—and readily separately disconnected from—said master coupling member, as well as from the remainder of the thus constituted train.

27. In combination: at least one airborne glider craft to be towed by a first tow-plane and thence switched therefrom as a tow-burden to a second tow-plane; the said first tow-plane; and a main tow-line extending therefrom to said glider, said tow-line having one end portion formed as a loop; the said second tow-plane; pickup tackle thereon which is adapted to engage said loop on said first plane; a duality of outboard members on said first tow-plane to which said loop is releasably attached, and between which outboard members a section of it is stretched; said tow-line being further provided with a coupling integral therewith at a point between said loop and said glider but normally closest to said loop; an auxiliary tow-line having one sectional portion thereof secured on board said first tow-plane; means on its opposite end portion which connects it releasably to said coupling; and means operable to release said auxiliary line from said coupling of the main tow-line incidental to an engaging contact being made between said pickup tackle and said stretched section of said loop.

OWEN BROWN.

References Cited in the file of this patent

UNITED STATES PATENTS

| Number | Name | Date |
|---|---|---|
| 6,818 | Cathcart | Oct. 23, 1849 |
| 298,086 | Henry | May 6, 1884 |
| 311,656 | Hall | Feb. 3, 1885 |
| 418,718 | Henning | Jan. 7, 1890 |
| 490,549 | Drill et al. | Jan. 24, 1893 |
| 1,036,901 | Pope et al. | Aug. 27, 1912 |
| 1,192,353 | Stevens | July 25, 1916 |
| 1,300,701 | Crosby et al. | Apr. 15, 1919 |
| 1,474,457 | Weinberg | Nov. 20, 1923 |
| 1,582,090 | Smith | Apr. 27, 1926 |
| 1,584,565 | Langer | May 11, 1926 |
| 1,707,821 | Stefani | Apr. 2, 1929 |
| 1,791,655 | Bisch | Feb. 10, 1931 |
| 1,857,960 | Johnson | May 10, 1932 |
| 1,912,722 | Perkins | June 6, 1933 |
| 1,925,555 | Bradshaw | Sept. 5, 1933 |
| 1,934,385 | Strauss | Nov. 7, 1933 |
| 1,992,800 | Adams | Feb. 26, 1935 |
| 1,992,941 | Fowler | Mar. 5, 1935 |
| 2,102,604 | Arndt | Dec. 21, 1937 |
| 2,149,161 | Byrnes | Feb. 28, 1939 |
| 2,231,560 | Campion | Feb. 11, 1941 |
| 2,247,273 | Blomberg | June 24, 1941 |
| 2,261,598 | Tyson | Nov. 4, 1941 |
| 2,364,598 | Beddow | Dec. 12, 1944 |
| 2,371,635 | McClure | Mar. 20, 1945 |
| 2,371,670 | Beddow | Mar. 20, 1945 |
| 2,373,086 | Alabrune | Apr. 10, 1945 |
| 2,373,414 | Plummer | Apr. 10, 1945 |
| 2,388,380 | Bathurst | Nov. 6, 1945 |
| 2,391,172 | Leland | Dec. 18, 1945 |
| 2,396,071 | Anderson | Mar. 5, 1946 |
| 2,400,310 | Lobelle | May 14, 1946 |
| 2,402,918 | Schultz | June 25, 1946 |
| 2,404,984 | Powers | July 30, 1946 |
| 2,405,718 | Darnell | Oct. 5, 1946 |
| 2,418,702 | Du Pont | Apr. 8, 1947 |
| 2,425,309 | Ennis | Aug. 12, 1947 |
| 2,431,132 | Malina | Nov. 18, 1947 |
| 2,433,437 | Cotton | Dec. 30, 1947 |
| 2,433,893 | Cowgill | Jan. 6, 1948 |
| 2,436,988 | Bell | Mar. 2, 1948 |

FOREIGN PATENTS

| Number | Country | Date |
|---|---|---|
| 369,228 | Great Britain | Mar. 16, 1932 |
| 527,663 | Germany | June 21, 1931 |
| 712,196 | France | July 13, 1931 |